US009686195B2

(12) United States Patent
Yamasaki et al.

(10) Patent No.: US 9,686,195 B2
(45) Date of Patent: Jun. 20, 2017

(54) RELAYING APPARATUS AND STORAGE APPARATUS

(71) Applicant: FUJITSU LIMITED, Kawasaki-shi, Kanagawa (JP)

(72) Inventors: Keisuke Yamasaki, Yokohama (JP); Katsuya Niigata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 114 days.

(21) Appl. No.: 14/612,413

(22) Filed: Feb. 3, 2015

(65) Prior Publication Data

US 2015/0244612 A1    Aug. 27, 2015

(30) Foreign Application Priority Data

Feb. 27, 2014    (JP) .................................. 2014-036206

(51) Int. Cl.
  *H04L 12/26*   (2006.01)
  *H04L 12/741*  (2013.01)
  *H04L 29/08*   (2006.01)
  *H04L 29/14*   (2006.01)

(52) U.S. Cl.
  CPC ........ *H04L 45/745* (2013.01); *H04L 67/1097* (2013.01); *H04L 69/40* (2013.01)

(58) Field of Classification Search
  None
  See application file for complete search history.

(56) References Cited

U.S. PATENT DOCUMENTS

| | | | | |
|---|---|---|---|---|
| 2006/0230125 | A1* | 10/2006 | Johnson ............. | G06F 13/4072 709/220 |
| 2007/0070975 | A1* | 3/2007 | Otani .................. | G06F 11/2007 370/351 |
| 2007/0165660 | A1* | 7/2007 | Fang ................... | G06F 11/201 370/410 |
| 2011/0320708 | A1* | 12/2011 | Otaka .................. | G06F 3/0611 711/114 |
| 2012/0023278 | A1* | 1/2012 | Jinno ................... | G06F 3/0605 710/300 |
| 2015/0046572 | A1* | 2/2015 | Cheng .................. | G06F 9/455 709/220 |

FOREIGN PATENT DOCUMENTS

| | | |
|---|---|---|
| JP | 2006-059201 | 3/2006 |
| JP | 2009-540436 | 11/2009 |
| JP | 2011-175421 | 9/2011 |
| WO | 2007/146515 | 12/2007 |

\* cited by examiner

*Primary Examiner* — Otis L Thompson, Jr.
(74) *Attorney, Agent, or Firm* — Fujitsu Patent Center

(57) ABSTRACT

A relaying apparatus placed between a control apparatus and a storage device in a storage apparatus includes a first connection unit, a second connection unit and a processor. The first connection unit is connected to a storage device. A detecting unit detects a link-down of the first connection unit. The processor executes a process in which, the address of the storage device that was connected to the first connection unit when the link-down has occurred to the first connection unit matches the address of the storage device connected to the second connection unit when the link-up has occurred to the second connection unit, and an access request is given from the control apparatus with an attached first identifier that identifies the first connection unit, data is forwarded via the second connection unit.

13 Claims, 44 Drawing Sheets

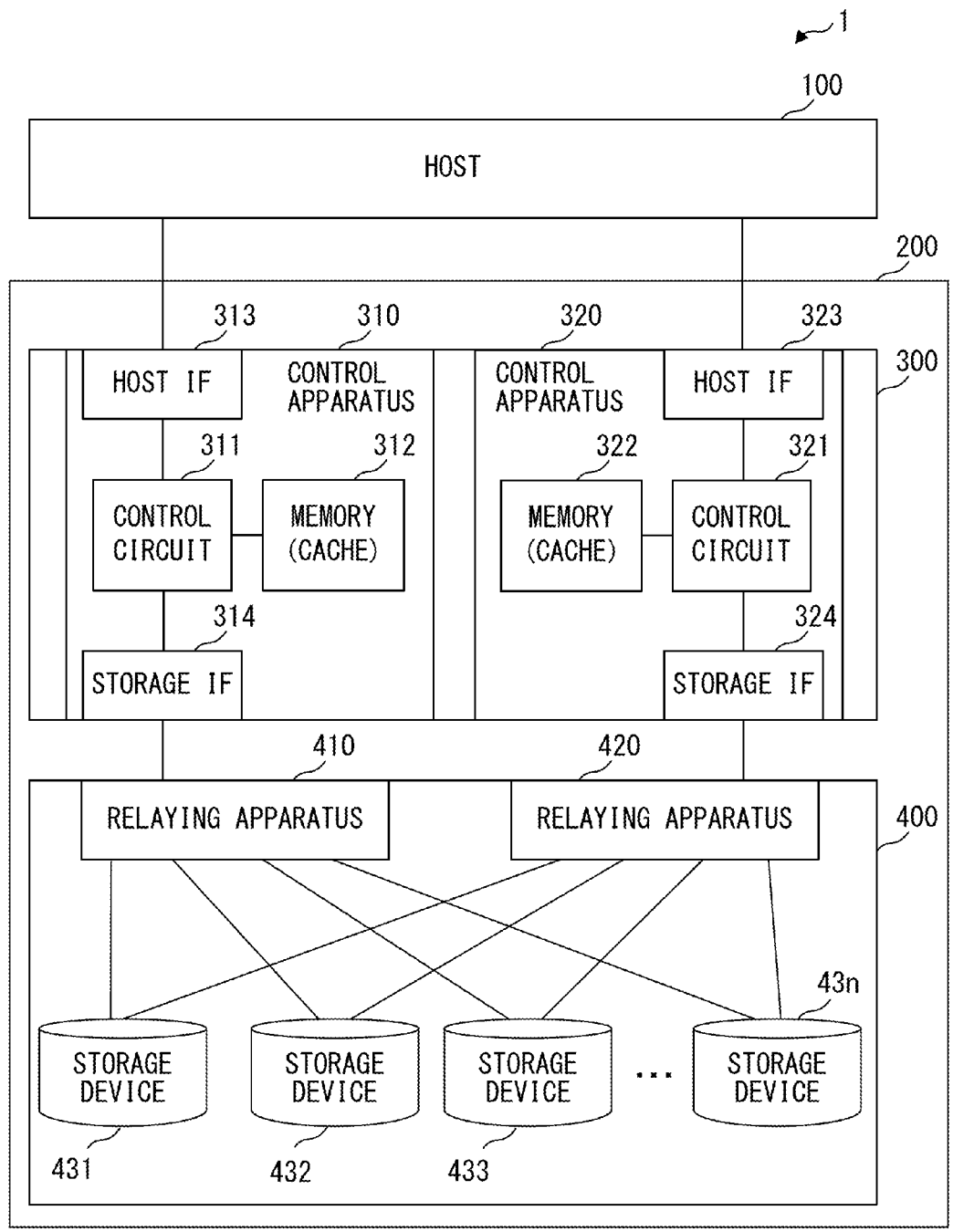
F I G. 1

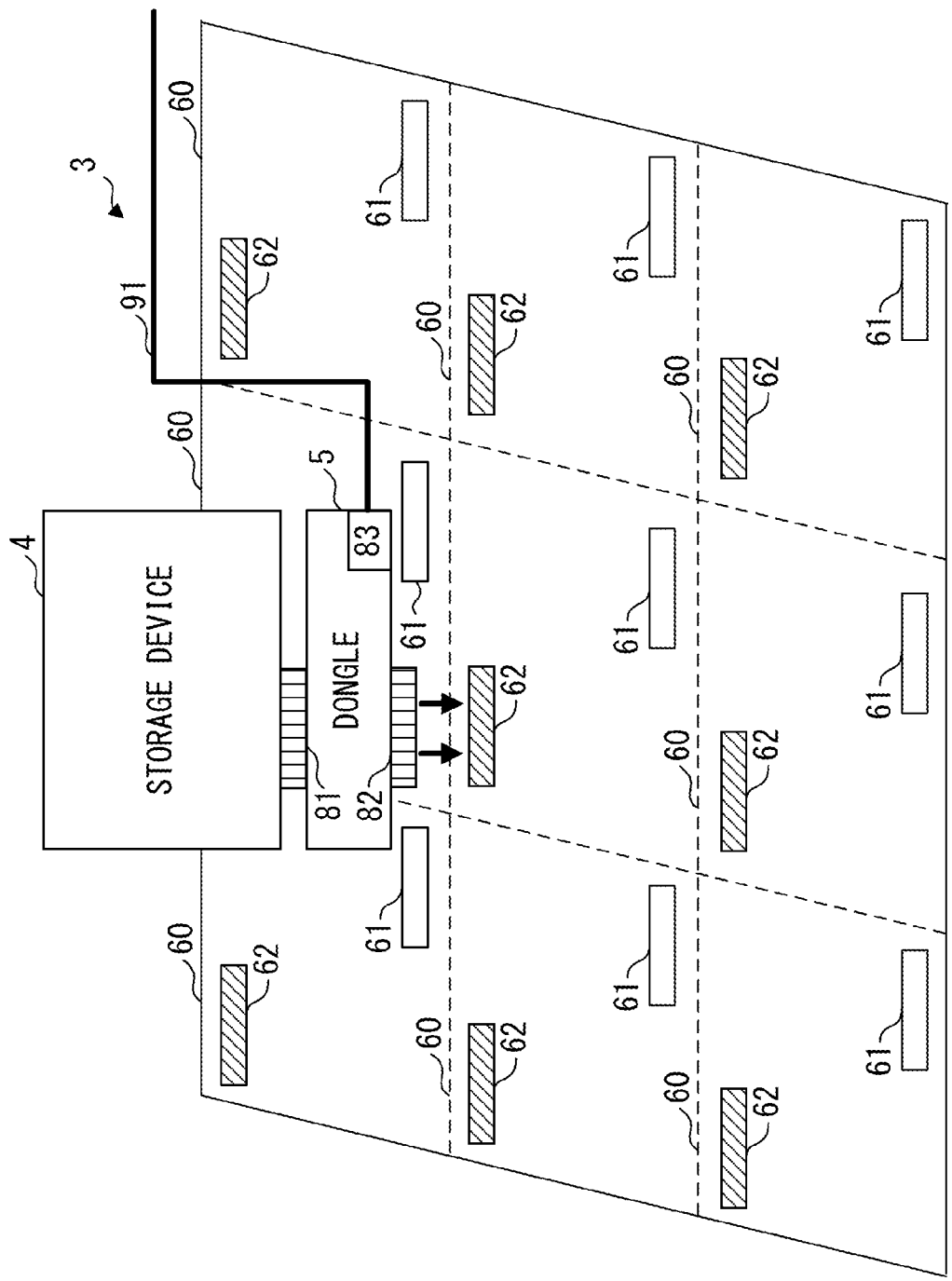
F I G. 5

| IDENTIFIER | 0 | 1 | 2 | ... | 62 | 63 |
|---|---|---|---|---|---|---|
| ADDRESS | A | B | C | ... | — | — |
| TYPE | zzzz | xxxx | yyyy | ... | — | — |
| CAPACITY | 250GB | 600GB | 400GB | ... | — | — |
| REVOLUTION | 7k | 15k | 15k | ... | — | — |
| ... | ... | ... | ... | ... | ... | ... |

| IDENTIFIER | 0 | 1 | 2 | ... | 62 | 63 |
|---|---|---|---|---|---|---|
| ADDRESS | — | — | — | ... | — | — |
| LINK-DOWN ORDER | — | — | — | ... | — | — |

31

| IDENTIFIER | 0 | 1 | 2 | ... | 62 | 63 |
|---|---|---|---|---|---|---|
| ADDRESS | A | — | C | ⋮ | — | — |
| TYPE | zzzz | — | yyyy | ⋮ | — | — |
| CAPACITY | 250GB | — | 400GB | ⋮ | — | — |
| REVOLUTION | 7k | — | 15k | ⋮ | — | — |
| ... | ... | ... | ... | ... | ... | ... |

| IDENTIFIER | 0 | 1 | 2 | ... | 62 | 63 |
|---|---|---|---|---|---|---|
| ADDRESS | — | B | — | ... | — | — |
| LINK-DOWN ORDER | — | 1 | — | ... | — | — |

| IDENTIFIER | 0 | 1 | 2 | ... | 62 | 63 |
|---|---|---|---|---|---|---|
| ADDRESS | A | B | C | ... | — | — |
| FEATURE INFORMATION | ... | ... | ... | ... | — | — |

| IDENTIFIER | 0 | 1 | 2 | ... | 62 | 63 |
|---|---|---|---|---|---|---|
| ADDRESS | — | — | — | ... | — | — |
| LINK-DOWN ORDER | — | — | — | ... | — | — |

31

| IDENTIFIER | 0 | 1 | 2 | ... | 62 | 63 |
|---|---|---|---|---|---|---|
| ADDRESS | A | — | C | ... | — | — |
| FEATURE INFORMATION | ... | — | ... | ... | — | — |

FIG. 14A

| IDENTIFIER | 0 | 1 | 2 | ... | 62 | 63 |
|---|---|---|---|---|---|---|
| ADDRESS | — | B | — | ... | — | — |
| LINK-DOWN ORDER | — | 1 | — | ... | — | — |

FIG. 14B

| IDENTIFIER | 0 | 1 | 2 | ... | 62 | 63 |
|---|---|---|---|---|---|---|
| ADDRESS | A | — | C | ... | — | B |
| FEATURE INFORMATION | ... | — | ... | ... | — | — |

| IDENTIFIER | 0 | — | 2 | ... | 62 | 1 |
|---|---|---|---|---|---|---|
| ADDRESS | A | — | C | ... | — | B |
| FEATURE INFORMATION | ... | — | ... | ... | — | — |

F I G. 17B

| IDENTIFIER | 0 | — | 2 | ... | 62 | 1 |
|---|---|---|---|---|---|---|
| ADDRESS | — | — | — | ... | — | — |
| LINK-DOWN ORDER | — | — | — | ... | — | — |

FIG. 20A

| IDENTIFIER | 0 | 1 | 2 | ... | 62 | 63 |
|---|---|---|---|---|---|---|
| ADDRESS | A | — | — | ... | — | — |
| FEATURE INFORMATION | ... | — | — | ... | — | — |

| IDENTIFIER | 0 | 1 | 2 | ... | 62 | 63 |
|---|---|---|---|---|---|---|
| ADDRESS | — | B | C | ... | — | — |
| LINK-DOWN ORDER | — | 2 | 1 | ... | — | — |

~31

F I G. 22

| IDENTIFIER | 0 | 1 | 2 | ... | 62 | 63 |
|---|---|---|---|---|---|---|
| ADDRESS | A | — | — | ... | — | $\beta$ |
| FEATURE INFORMATION | ... | — | — | ... | — | — |

~21

| IDENTIFIER | 0 | 1 | — | ... | 62 | 2 |
|---|---|---|---|---|---|---|
| ADDRESS | A | — | — | ... | — | β |
| FEATURE INFORMATION | ... | — | — | ... | — | — |

| IDENTIFIER | 0 | 1 | — | ... | 62 | 2 |
|---|---|---|---|---|---|---|
| ADDRESS | — | B | — | ... | — | — |
| LINK-DOWN ORDER | — | 1 | — | ... | — | — |

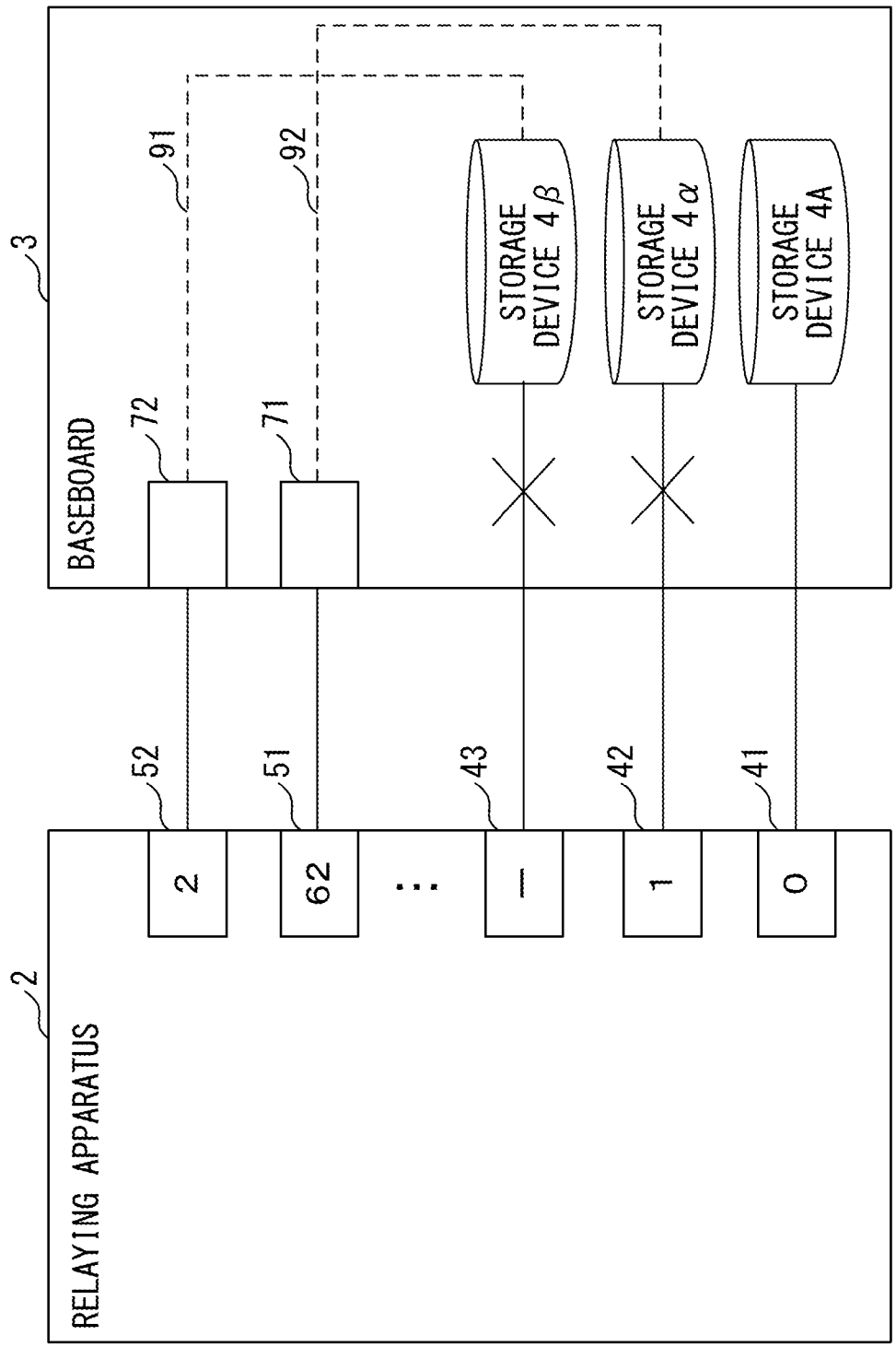
F I G. 24

| IDENTIFIER | 0 | 1 | — | ... | 62 | 2 |
|---|---|---|---|---|---|---|
| ADDRESS | A | — | — | ... | α | β |
| FEATURE INFORMATION | ... | — | — | ... | — | — |

FIG. 25

| IDENTIFIER | 0 | — | — | ⋮ | 1 | 2 |
|---|---|---|---|---|---|---|
| ADDRESS | A | — | — | ⋮ | α | β |
| FEATURE INFORMATION | ⋮ | — | — | ⋮ | — | — |

FIG. 26A  ~21

| IDENTIFIER | 0 | — | — | ⋮ | 1 | 2 |
|---|---|---|---|---|---|---|
| ADDRESS | — | — | — | ⋮ | — | — |
| LINK-DOWN ORDER | — | — | — | ⋮ | — | — |

| IDENTIFIER | 0 | 1 | 2 | ... | 62 | 63 |
|---|---|---|---|---|---|---|
| ADDRESS | — | — | — | ⋮ | — | — |
| TYPE | — | — | — | ⋮ | — | — |
| CAPACITY | — | — | — | ⋮ | — | — |
| REVOLUTION | — | — | — | ⋮ | — | — |
| ... | ... | ... | ... | ... | ... | ... |
| LINK-DOWN ORDER | — | — | — | ⋮ | — | — |

31

| IDENTIFIER | 0 | 1 | 2 | ... | 62 | 63 |
|---|---|---|---|---|---|---|
| ADDRESS | A | — | — | ... | — | α |
| FEATURE INFORMATION | ... | — | — | ... | — | — |

FIG. 29A (21)

| IDENTIFIER | 0 | 1 | 2 | ... | 62 | 63 |
|---|---|---|---|---|---|---|
| ADDRESS | — | B | C | ... | — | — |
| LINK-DOWN ORDER | — | 2 | 1 | ... | — | — |

| IDENTIFIER | 0 | 1 | — | ... | 62 | 2 |
|---|---|---|---|---|---|---|
| ADDRESS | A | — | — | ... | — | α |
| FEATURE INFORMATION | ... | — | — | ... | — | — |

| IDENTIFIER | 0 | 1 | — | ... | 62 | 2 |
|---|---|---|---|---|---|---|
| ADDRESS | — | B | — | ... | — | — |
| LINK-DOWN ORDER | — | 1 | — | ... | — | — |

| IDENTIFIER | 0 | 1 | — | ... | 62 | 2 |
|---|---|---|---|---|---|---|
| ADDRESS | A | — | — | ... | β | α |
| FEATURE INFORMATION | ... | — | — | ... | — | — |

| IDENTIFIER | 0 | — | ... | 1 | 2 | ~21 |
|---|---|---|---|---|---|---|
| ADDRESS | A | — | ... | β | α | |
| FEATURE INFORMATION | ... | — | ... | — | — | |

FIG. 33B

| IDENTIFIER | 0 | — | ... | 1 | 2 | ~31 |
|---|---|---|---|---|---|---|
| ADDRESS | — | — | ... | — | — | |
| LINK-DOWN ORDER | — | — | ... | — | — | |

| IDENTIFIER | 0 | 1 | 2 | ... | 62 | 63 |
|---|---|---|---|---|---|---|
| ADDRESS | — | B | — | ... | — | — |
| TYPE | — | xxxx | — | ... | — | — |
| CAPACITY | — | 600GB | — | ... | — | — |
| REVOLUTION | — | 15k | — | ... | — | — |
| ... | ... | ... | ... | ... | ... | ... |
| LINK-DOWN ORDER | — | 1 | — | ... | — | — |

FIG. 34

| IDENTIFIER | 0 | 1 | 2 | ... | 62 | 63 |
|---|---|---|---|---|---|---|
| ADDRESS | — | B | C | ... | — | — |
| TYPE | — | xxxx | yyyy | ... | — | — |
| CAPACITY | — | 600GB | 400GB | ... | — | — |
| REVOLUTION | — | 15k | 15k | ... | — | — |
| ... | ... | ... | ... | ... | ... | ... |
| LINK-DOWN ORDER | — | 2 | 1 | ... | — | — |

31

F I G. 3 5

| IDENTIFIER | 0 | 1 | 2 | ... | 62 | 63 |
|---|---|---|---|---|---|---|
| ADDRESS | A | — | — | ... | — | α |
| TYPE | zzzz | — | — | ... | — | aaaa |
| CAPACITY | 250GB | — | — | ... | — | 600GB |
| REVOLUTION | 7k | — | — | ... | — | 15k |
| ... | ... | ... | ... | ... | ... | ... |

21

F I G. 3 6

| IDENTIFIER | 0 | — | 2 | ... | 62 | 1 |
|---|---|---|---|---|---|---|
| ADDRESS | A | — | — | ... | — | α |
| TYPE | zzzz | — | — | ... | — | aaaa |
| CAPACITY | 250GB | — | — | ... | — | 600GB |
| REVOLUTION | 7k | — | — | ... | — | 15k |
| ... | ... | ... | ... | ... | ... | ... |

FIG. 37

| IDENTIFIER | 0 | ... | 2 | ... | 62 | 1 |
|---|---|---|---|---|---|---|
| ADDRESS | — | — | C | ... | — | — |
| TYPE | — | — | yyyy | ... | — | — |
| CAPACITY | — | — | 400GB | ... | — | — |
| REVOLUTION | — | — | 15k | ... | — | — |
| ... | ... | ... | ... | ... | ... | ... |
| LINK-DOWN ORDER | — | — | 1 | ... | — | — |

31

F I G. 3 8

RELAYING APPARATUS AND STORAGE APPARATUS

CROSS-REFERENCE TO RELATED APPLICATION

This application is based upon and claims the benefit of priority of the prior Japanese Patent Application No. 2014-036206, filed on Feb. 27, 2014, the entire contents of which are incorporated herein by reference.

FIELD

The embodiments discussed herein are related to a technique for relaying data.

BACKGROUND

In a storage apparatus, when a plurality of storage devises are implemented, a relaying apparatus for forwarding data transmitted from the control apparatus to each storage device is used. The storage device is a drive such as an HDD (Hard Disk Drive) and an SSD (Solid State Drive) that support an SAS (Serial Attached SCSI), for example. The control apparatus is a CM (Control Module) or the like, for example. The relaying apparatus is an expander or the like, for example.

When accessing a storage device, a host computer transmits an access request with an attached LUN (Logical Unit Number) to the control apparatus. The host computer is an information processing apparatus such as a server, for example. An access request is a request for writing of data and reading of data, for example. Then, the host computer executes writing of data into the storage device and reading of data from the storage device by transmitting an access request to the storage device. In the explanation below, the host computer may simply be referred to as a host.

The control apparatus is equipped with a memory, for example. Meanwhile, the memory stores a management table in which identifiers that identify connection units provided in the relaying apparatus are associated with and stored with the LUNs. The connection unit is a PHY (Physic Layer) or the like, for example. The PHY is a physical port in the SAS standard. The identifier is a PHY number, for example. The PHY number is the port number of the PHY.

Upon receiving an access request with an attached LUN from the host, the control apparatus performs a search in the management table, and the control apparatus extracts a first identifier associated with the LUN. Then, the control apparatus transmits the access request with the extracted first identifier attached to the access request, to the relaying apparatus.

Upon receiving the access request with the attached first identifier, the relaying apparatus forwards the access request to the storage device via a first connection unit identified by the first identifier.

According to the above, the host accesses the storage device, and the host executes writing of data into the storage device and reading of data from the storage device.

As another related technique, a technique has been known (for example, Japanese National Publication of International Patent Application No. 2009-540436) in which an SAS expander includes SAS PHYs to transmit and receive signals to and from SAS devices on corresponding SAS links connected to the SAS PHYs. The SAS expander includes a status register that provides a failure detection parameter regarding the communication on the SAS link. The microprocessor of the SAS expander identifies the communication which is having a failure in one of the SAS links, according to the failure detection parameter.

In the relaying apparatus in the relaying technique described above, when a link-down occurs between a first connection unit and a storage device, the storage device to which the link-down has occurred is connected to a second connection unit which is an extra connection unit in the relaying apparatus, and a link-up occurs to the second connection unit. At this time, there is a problem wherein higher-order apparatuses such as the host and the control apparatus identify the storage device according to the identifier that identifies the connection unit to which the storage device is connected, and therefore, it is impossible to access the storage device to which the link-down has occurred in the same manner as before the link-down.

SUMMARY

According to an aspect of the embodiments, A relaying apparatus that is placed between a control apparatus and a storage device in a storage apparatus includes a first connection unit, a second connection unit, a detecting unit, and a forwarding unit. The first connection unit is connected to a storage device. The detecting unit detects a link-down of the first connection unit. The forwarding unit judges a match between an address of a storage device that was connected to the first connection unit at the time when the detecting unit detected the link-down of the first connection unit and an address of a storage device connected to the second connection unit at the time when the storage device is connected to the second connection unit and a link-up occurs to the second connection unit. The forwarding unit forwards data via the second connection unit, when the address of the storage device that was connected to the first connection unit matches the address of the storage device connected to the second connection unit, and an access request is given from the control apparatus with an attached first identifier that identifies the first connection unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram illustrating an example of a storage system;

FIG. 5 is a diagram (2) explaining the implementation of the storage device;

FIG. 7 is a diagram illustrating an example of a first table at the time when a storage apparatus is started up;

FIG. 8 is a diagram illustrating an example of a second table at the time when a storage apparatus is started up;

FIG. 9 is a diagram illustrating an example of a first table at the time when a link-down occurs to a first connection unit;

FIG. 10 is a diagram illustrating a second table at the time when a link-down occurs to a first connection unit;

FIG. 12A and FIG. 12B are diagrams illustrating an example of a first table and a second table at the time when a storage apparatus is started up;

FIG. 14A and FIG. 14B are diagrams illustrating a first table and a second table at the time when a link-down occurs to a first connection unit;

FIG. 16 is a diagram illustrating an example of a first table at the time when a link-up occurs to the second connection unit;

FIG. 17A and FIG. 17B are diagrams illustrating an example of a first table and a second table when a link-up occurs to a second connection unit;

FIG. 20A and FIG. 20B are diagrams illustrating an example of a first table and a second table at the time when a link-down occurs to the first connection unit;

FIG. 22 is a diagram illustrating an example of a first table at the time when a link-up occurs to the second connection unit;

FIG. 23A and FIG. 23B are diagrams illustrating an example of a first table and a second table at the time when a link-up occurs to the second connection unit;

FIG. 24 is a diagram (7) illustrating the connection between a relaying apparatus and a storage device;

FIG. 25 is a diagram illustrating an example of a first table at the time when a link-up occurs to a second connection unit;

FIG. 26A and FIG. 26B are diagrams illustrating a first table and a second table at the time when a link-up occurs to a second connection unit;

FIG. 27 is a diagram illustrating an example of a second table at the time when a storage apparatus is started up;

FIG. 29A and FIG. 29B are diagrams illustrating a first table and a second table at the time when a link-up occurs to a second connection unit.

FIG. 30A and FIG. 30B are diagrams illustrating an example of a first table and a second table at the time when a link-up occurs to a second connection unit;

FIG. 32 is a diagram illustrating an example of a first table at the time when a link-up occurs to a second connection unit;

FIG. 33A and FIG. 33B are diagrams illustrating an example of a first table and a second table at the time when a link-up occurs to a second connection unit;

FIG. 34 is a diagram illustrating an example of a second table at the time when a link-down occurs to a first connection unit;

FIG. 35 is a diagram illustrating an example of a second table at the time when a link-down occurs to a first connection unit;

FIG. 36 is a diagram illustrating an example of a first table at the time when a link-up occurs to a second connection unit;

FIG. 37 is a diagram illustrating an example of a first table at the time when a link-up occurs to a second connection unit;

FIG. 38 is a diagram illustrating an example of a second table at the time when a link-up occurs to a second connection unit;

DESCRIPTION OF EMBODIMENTS

Figure 2:
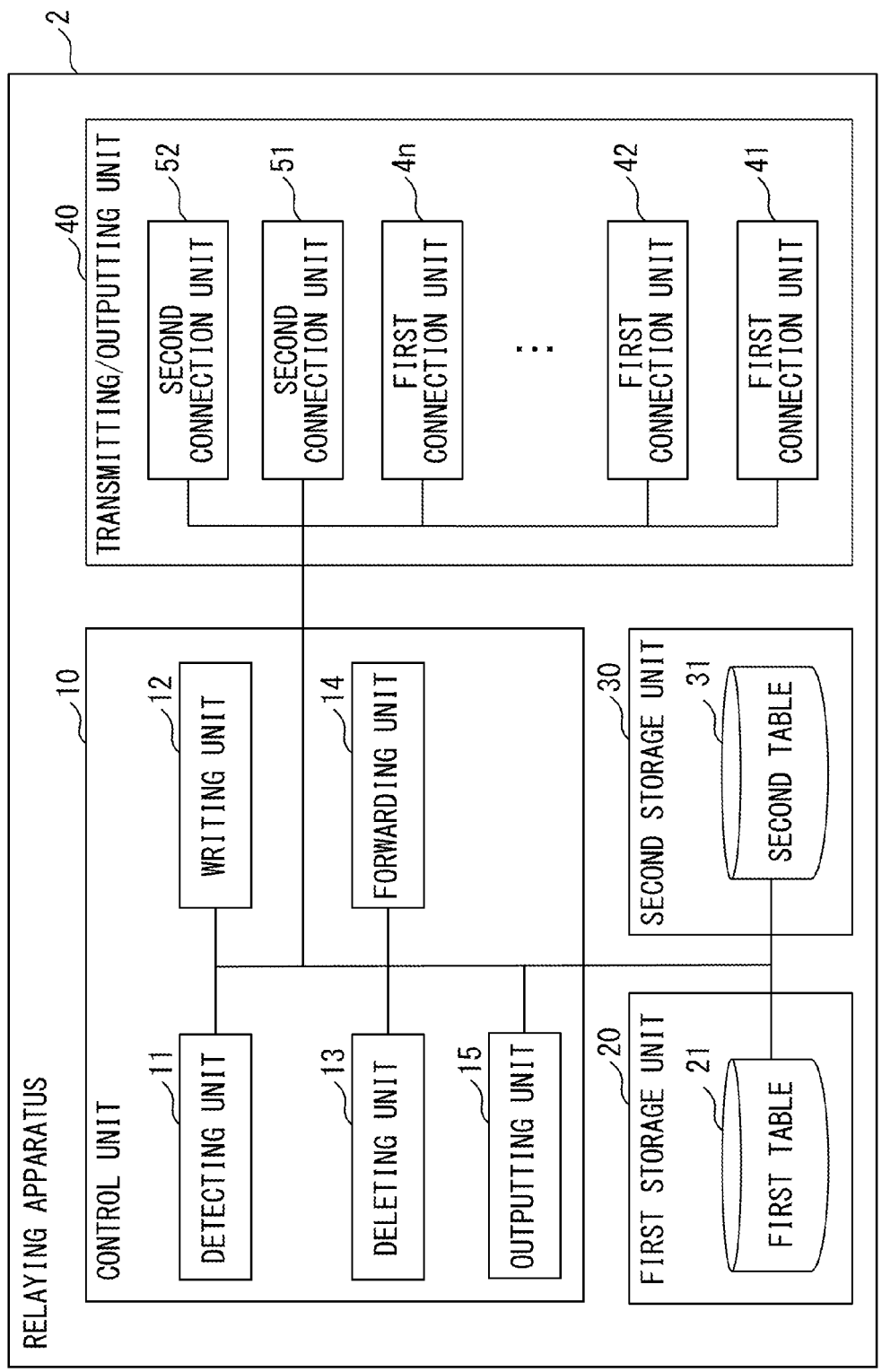
FIG. 2 is a functional block diagram illustrating an example of a relaying apparatus.

A relaying apparatus according to an embodiment is explained.

FIG. 1 is a diagram illustrating an example of a storage system.

With reference to FIG. 1, a storage system equipped with a relaying apparatus according to an embodiment is explained.

A storage system 1 is equipped with a host 100 and a storage apparatus 200, for example. The host 100 and the storage apparatus 200 are connected by a network, for example.

The storage apparatus 200 is equipped with a CE (Controller Enclosure) 300 and a DE (Drive Enclosure) 400. The CE 300 and the DE 400 are connected by a communication cable, for example. The communication cable is an SAS cable, for example. The CE 300 is equipped with a control apparatus 310 and a control apparatus 320, for example. The DE 400 is equipped with a relaying apparatus 410, a relaying apparatus 420, and storage devices 431 through 43n.

In the explanation below, the control apparatus 310 and the control apparatus 320 have the same configuration, and therefore, explanation is given for the control apparatus 310, and explanation for the control apparatus 320 is omitted. Meanwhile, the relaying apparatus 410 and the relaying apparatus 420 have the same configuration, and therefore, explanation is given for the relaying apparatus 410, and explanation for the relaying apparatus 420 is omitted. Meanwhile, when the control apparatus 310 and the control apparatus 320 are not particularly distinguished, the term "control apparatus 330" is used. When the relaying apparatus 410 and the relaying apparatus 420 are not particularly distinguished, the term "relaying apparatus 2" is used. When the storage devices 431 through 43n are not particularly distinguished, the term "storage device 4" is used. When the host 100 and the CE 300 are collectively referred to, the term "higher-order apparatuses" may be used.

The host 100 stores an LUN, which is an identification number used when identifying each storage device 4 at the host 100 side, for example. When accessing the storage device 4, an input of the LUN from the user is accepted.

Then, the host 100 transmits an access request to the control apparatus 310 with the input LUN attached to the access request. The LUN is generated according to the identifier (port number) of the connection unit (physical port) of the relaying apparatus 410 connected to the storage device 4, for example. In addition, when a failure occurs in the communication with the storage device 4 executed through the control apparatus 310, the host 100 may transmit an access request to the control apparatus 320 with an LUN input by the user being attached to the access request. Meanwhile, each of the relaying apparatus 410 and the relaying apparatus 420 is supposed to have a connection unit that is identified by the same identifier. That is, by inputting a prescribed LUN, the user is able to access a prescribed storage device 4 without being conscious of which of the relaying apparatus 410 and the relaying apparatus 420 the communication is being performed through.

The control apparatus 310 is equipped with a control circuit 311, a memory 312, a host IF 313, and a storage IF 314. The control apparatus 310 is a CM (Control Module), for example.

The control circuit 311 controls the entirety of the control apparatus 310. The control circuit 311 is a CPU, a multicore CPU, an FPGA (Field Programmable Gate Array), a PLD (Programmable Logic Device), or the like, for example.

The memory 312 is a semiconductor memory such as a ROM (Read Only Memory), a RAM (Random Access memory) and an SRAM (Static Random Access Memory), or the like. The ROM stores firmware, for example. Then, the RAM is used as a work area of the control circuit 311, for example. Meanwhile, the SRAM is used as a cache to temporarily store data to be transmitted and received, for example.

The host IF 313 is an interface to communicate with the host 100 through a network, for example.

The storage IF 314 is an interface to communicate with the DE 400 through a communication cable, for example.

For example, at the time of the startup of the storage apparatus 200, the control apparatus 310 obtains, from the relaying apparatus 410, the address of each storage device 4 connected to the relaying apparatus 410 and an identifier that identifies the connection unit to which each storage device 4 is connected, and the control apparatus 310 associates them with and stores them in a management table. The management table is stored in the memory 312, for example.

Then, for example, in response to a request from the host 100, the control apparatus 310 generates a LUN using the identifier stored in the management table, and the control apparatus 310 reports the generated LUN to the host 100. Meanwhile, the control circuit 311 associates the generated LUN with the identifier and stores them in the management table.

When an access request with an attached LUN is given from the host 100, the control circuit 311 performs a search in the management table, and when there is an identifier corresponding to the LUN in the management table, the control circuit 311 transmits an access request with the corresponding identifier attached to the access request to the relaying apparatus 410. Then, when an access request with the attached identifier is given from the control circuit 311, the relaying apparatus 410 forwards the access request to the connection unit corresponding to the given identifier. According to the above, in the storage system 1, an access request is reported from the host 100 to the storage device 4.

The relaying apparatus 410 is an expander described later, for example. Then, the relaying apparatus 410 is connected to a plurality of storage devices 4, and the relaying apparatus 410 relays the communication between the control apparatus 310 and each of the storage devices 4.

FIG. 2 is a functional block diagram illustrating an example of the relaying apparatus.

With reference to FIG. 2, the relaying apparatus 2 is explained.

The relaying apparatus 2 is equipped with a control unit 10, a first storage unit 20, a second storage unit 30, and a transmitting/receiving unit 40, for example. The relaying apparatus 2 is an expander explained later, for example, The control unit 10 includes a detecting unit 11, a writing unit 12, a deleting unit 13, a forwarding unit 14, and an outputting unit 15. The first storage unit 20 stores a first table 21. The second storage unit 30 stores a second table 31. Meanwhile, the transmitting/receiving unit 40 includes first connection units 41 through 4n and second connection units 51 and 52. In the explanation below, when the first connection units 41 through 4n are not particularly distinguished, the term "first connection unit 4m" is used. In addition, when the second connection units 51 and 52 are not particularly distinguished, the term "second connection unit 5m" is used.

The detecting unit 11 detects a link-down of the first connection unit 4m. Link-down refers to a status in which a connection unit and a storage device 4 connected to the connection unit are unable to communicate, for example. Meanwhile, link-up refers to a status in which a connection unit and a storage device 4 connected to the connection unit are able to communicate, for example. In the explanation below, a link-down occurring between a connection unit and a storage device 4 is also referred to simply as a link-down occurring to the connection unit, or a link-down occurring to the storage device 4. In addition, a link-up occurring between a connection unit and a storage device 4 is also referred to simply as a link-up occurring to the connection unit, or a link-up occurring to the storage device 4.

The writing unit 12 associates a first identifier that identifies the first connection unit 4m to which a link-down has occurred with the address of the storage device 4 to which a link-down has occurred, and the writing unit 12 writes them into the second table. In addition, when a link-up occurs to the second connection unit 5m, the writing unit 12 judges whether or not the address of the storage device 4 to which a link-up has occurred is stored in the second table 31. Then, when the address of the storage device 4 to which the link-up has occurred is stored in the second table, the writing unit 12 associates the first identifier associated with the address and the address of the storage device 4 to which the link-up has occurred and the writing unit 12 writes them into the first table 21.

The process described above that associates the first identifier in the second table 31 associated with the address of the storage device 4 to which a link-up has occurred with the address of the storage device 4 to which the link-up has occurred and that writes them into the first table 21 is described in greater detail.

The writing unit 12 associates the first identifier that identifies the first connection unit 4m to which a link-down has occurred with the address of the storage device 4 to which a link-down has occurred, and the writing unit 12 writes them into the second table 31. Meanwhile, when a link-up occurs to the second connection unit 5m, the writing unit 12 associates the second identifier that identifies the second connection unit 5m to which the link-up has occurred with the address of the storage device 4 to which a link-up has occurred, and the writing unit 12 writes them into the first table 21. In addition, the writing unit 12 judges whether or not the address of the storage device 4 to which the link-up has occurred is stored in the second table 31. When the address of the storage device 4 to which the link-up has occurred is stored in the second table 31, the writing unit 12 extracts the second identifier associated with the address of the storage device 4 to which the link-up has occurred from the first table 21. Then, the writing unit 12 rewrites the extracted second identifier stored in the first table 21 into the first identifier that is stored in the second table 31 and that is associated with the address of the storage device 4 to which the link-up has occurred.

According to the above, the writing unit 12 associates the first identifier in the second table 31 associated with the address of the storage device 4 to which a link-up has occurred with the address of the storage device 4 to which the link-up has occurred, and the writing unit 12 writes them into the first table 21. Accordingly, the same first identifier as that before the link-down is associated with and stored with the same storage device 4 in the first table 21. Therefore, the higher-order apparatuses may access the storage device to which a link-down has occurred in the same manner as before the link-down.

The writing unit 12 further associates the first identifier that identifies the first connection unit 4*m* to which a link-down has occurred with a link-down order that indicates the order of the link-down that has occurred to the first connection unit 4*m* to which the link-down has occurred, and the writing unit 12 writes them into the second table 31. Then, when a link-up occurs to the second connection unit 5*m*, the writing unit 12 judges whether or not the address of the storage device 4 to which the link-up has occurred is stored in the second table 31. When the address of the storage device 4 to which the link-up has occurred is not in the second table 31, the writing unit 12 obtains the first identifier that is stored in the second table 31 and that is associated with the order specified by the link-down order. Then, the writing unit 12 associates the obtained first identifier with the address of the storage device 4 to which the link-up has occurred, and the writing unit 12 writes them into the first table 21.

The process described above that associates the first identifier associated with the order specified by the link-down order with the address of the storage device 4 to which the link-up has occurred and that writes them into the first table 21 is described in greater detail.

The writing unit 12 associates the first identifier that identifies the first connection unit 4*m* to which a link-down has occurred with a link-down order that indicates the order of the link-down that has occurred to the first connection unit 4*m* to which the link-down has occurred, and the writing unit 12 writes them into the second table 31. Then, when a link-up occurs to the second connection unit 5*m*, the writing unit 12 judges whether or not the address of the storage device 4 to which a link-up has occurred is stored in the second table 31. When the address of the storage device 4 to which the link-up has occurred is not stored in the second table, the writing unit 12 extracts the second identifier associated with the address of the storage device 4 to which the link-up has occurred from the first table 21. Then, the writing unit 12 rewrites the extracted second identifier stored in the first table into the first identifier in the second table associated with the order specified by the link-down order. The order specified by the link-down order may be an order that indicates the link-down that occurred last in the link-down order, for example. Meanwhile, the order specified by the link-down order may be an order that indicates the link-down that occurred first in the link-down order, for example.

According to the above, the writing unit 12 associates the first identifier associated with the order specified by the link-down order with the address of the storage device 4 to which a link-up has occurred, and the writing unit 12 writes them into the first table 21. Accordingly, when the user connects another storage device 4 that has features that are equivalent to those of the failed storage device 4 to the second connection unit 5*m* according to the link-down order, the first identifier of the failed storage device 4 is associated with the connected other storage device 4. Therefore, the higher-order apparatuses may operate the storage apparatus 200 in the same manner as before the link-down.

The writing unit 12 further associates the first identifier that identifies the first connection unit 4*m* to which a link-down has occurred with feature information that indicates features of the storage device 4 connected to the first connection unit 4*m* to which a link-down has occurred, and the writing unit 12 writes them into the second table 31. In addition, when a link-up occurs to the second connection unit 5*m*, the writing unit 12 judges whether or not the address of the storage device 4 to which a link-up has occurred is stored in the second table 31. When the address of the storage device 4 to which the link-up has occurred is not stored in the second table 31, the writing unit 12 extracts feature information that at least partly corresponds to the feature information of the storage device 4 connected to the second connection unit 5*m*, from among feature information stored in the second table 31. Then, the writing unit 12 rewrites the second identifier that is stored in the first table 21 and that is associated with the address of the storage device 4 to which the link-up has occurred into the first identifier associated with the extracted feature information. Feature information is, for example, information including identification information and performance information such as the type, the capacity, and the revolution speed of the storage device 4, for example. Meanwhile, the features refer to parameters such as the type, the capacity, the revolution speed and the like.

The process described above that rewrites into the first identifier associated with extracted feature information the second identifier that is stored in the first table 21 and that is associated with the address of the storage device 4 to which a link-up has occurred is described in greater detail. In the explanation below, explanation is given assuming that the feature information includes a plurality of features.

The writing unit 12 searches for a feature that corresponds to a feature that storage device 4 connected to the second connection unit 5*m* possesses, from among the feature information, in order from a feature of a type that has a larger influence on the operation of the storage apparatus 200 with a change of the storage device 4, from among the plurality of types of features that the storage device 4 possesses. Then, when there is one corresponding feature for one feature type stored in the second table 31, the writing unit 12 rewrites the second identifier that is stored in the first table 21 and that is associated with the address of the storage device to which a link-up has occurred into the first identifier associated with the corresponding feature.

A search in order from a feature of a type that has a larger influence is a process in which, when the feature information includes the type, the capacity, and the revolution speed, a search for a type that corresponds to the type of the storage device 4 is performed, then a search for the capacity that corresponds to the capacity of the storage device 4 is performed, and then a search for the revolution speed that corresponds to the revolution speed of the storage device 4 is performed.

When the number of the type of the storage device becomes a different number due to a change, this indicates that a storage device 4 of a different type is connected, and therefore, the type of the storage device 4 is considered to have the largest influence on the operation of the storage apparatus 200 with a change. Meanwhile, when the capacity of the storage device 4 becomes smaller due to a change, it may become impossible to store data that was stored in the storage device 4 before the change, and therefore, the capacity of the storage device 4 is considered to have a larger influence on the operation of the storage apparatus 200 with a change than the influence of the revolution speed. When the revolution speed of the storage device 4 becomes slower due to a change, the throughput of data writing and reading decreases compared with that in the storage device 4 before the change. However, even when the revolution speed of the storage device 4 becomes slower, it is still possible to store data that was stored in the storage device 4 before the change, and therefore the revolution speed of the storage device 4 is considered to have a smaller influence on the storage apparatus 200 with a change than the influence of the capacity. Meanwhile, the magnitude of the influences on the operation of the storage apparatus 200 with a change may be set by the user appropriately.

According to the above, the writing unit 12 rewrites the second identifier that is stored in the first table 21 and that is associated with the address of the storage device 4 to which a link-up has occurred into the first identifier associated with the extracted feature information. Accordingly, when the user connects another storage device 4 that has features that are equivalent to those of the failed storage device 4 to the second connection unit 5*m*, the first identifier of the failed storage device 4 is associated with the connected other storage device 4. Therefore, the higher-order apparatuses may operate the storage apparatus 200 in the same manner as before the link-down.

The deleting unit 13 waits until the writing unit 12 associates the first identifier that identifies the first connection unit 4*m* to which a link-down has occurred with the address of the storage device 4 to which a link-up has occurred, and the writing unit 12 writes them into the first table 21. Then, when the writing into the first table 21 by the writing unit 12 is completed, the deleting unit 13 deletes from the first table 21 the record in which the first identifier that identifies the first connection unit 4*m* to which the link-down has occurred is associated with the address of the storage device 4 to which the link-down has occurred.

When an access request with an attached first identifier is given from the control apparatus 310, the forwarding unit 14 refers to the first table 21, and the forwarding unit 14 forwards data via the connection unit corresponding to the first identifier.

That is, the forwarding unit 14 judges whether or not the address of the storage device 4 to which the link-down occurred at the time when the detecting unit 11 detected a link-down of the first connection unit 4*m* matches the address of the storage device 4 connected to the second connection unit 5 at the time when a link-up occurs to the second connection unit 5*m*. Then, when the two addresses for which the correspondence judgment has been performed match, and when an access request with the first identifier that identifies the first connection unit 4*m* attached to the access request is given from the control apparatus 310, the forwarding unit 14 forwards data via the second connection unit 5*m*.

The outputting unit 15 outputs information in which the first identifier that is stored in the second table 31 and that identifies the first connection unit 4*m* to which a link-down has occurred is associated with the link-down order that indicates the order of the link-down that has occurred to the first connection unit 4*m* to which the link-down has occurred. Accordingly, the user is able to check the link-down order and to make a link-up for the second connection unit 5*m* and the storage device 4 according to the link-down order.

The first table 21 associates and stores the first identifier that identifies the first connection unit 4*m* or the second identifier that identifies the second connection unit 5*m* with the address and the feature information of the storage device 4.

The second table 31 associates and stores the first identifier that identifies the first connection unit 4*m* or the second identifier that identifies the second connection unit 5*m* with the address, the feature information, and the link-down order of the storage device 4.

The first connection unit 4*m* is, for example, a physical port to which the storage device 4 is connected, before a link-down occurs between the relaying apparatus 2 and the storage device 4.

The second connection unit 5*m* is, for example, a physical port to which the storage device 4 is not connected, before a link-down occurs between the relaying apparatus 2 and the storage device 4. The relaying apparatus 2 may be equipped with not only two second connection units 5*m* but also one or any greater number of second connection units 5*m*. In the explanation below, it is assumed that there are two second connection units 5*m*.

Figure 3:
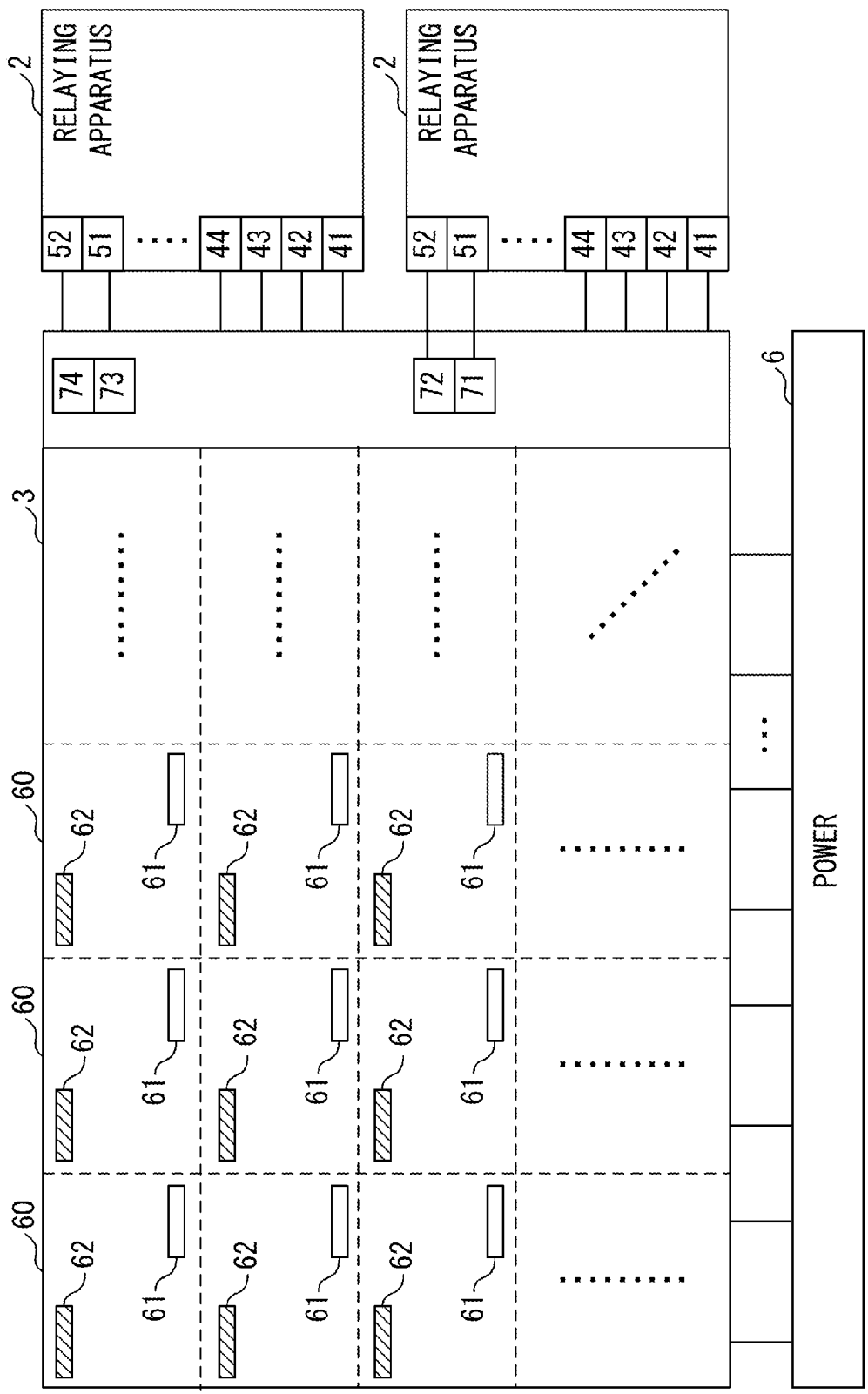
FIG. 3 is a block diagram illustrating an example of a baseboard.

FIG. 3 is a block diagram illustrating an example of a baseboard.

With reference to FIG. 3, the baseboard on which the storage device 4 is mounted is explained. In the explanation below, the baseboard may also be simply referred to as a board.

A board 3 is equipped with a plurality of slots 60 and third connection units (third ports) 71 through 74. In the explanation below, when the third connection units 71 through 74 are not particularly distinguished, the term "third connection unit 70" is used.

In the slot 60, a first connector 61 and a second connector 62 are point-symmetrically positioned.

The first connector 61 is connected to the first connection unit 4*m* (first port) provided in the relaying apparatus 2 and to a power 6.

The second connector 62 is connected to the power 6.

The third connection unit 70 is connected to the second connection unit 5*m* (second port).

Figure 4:
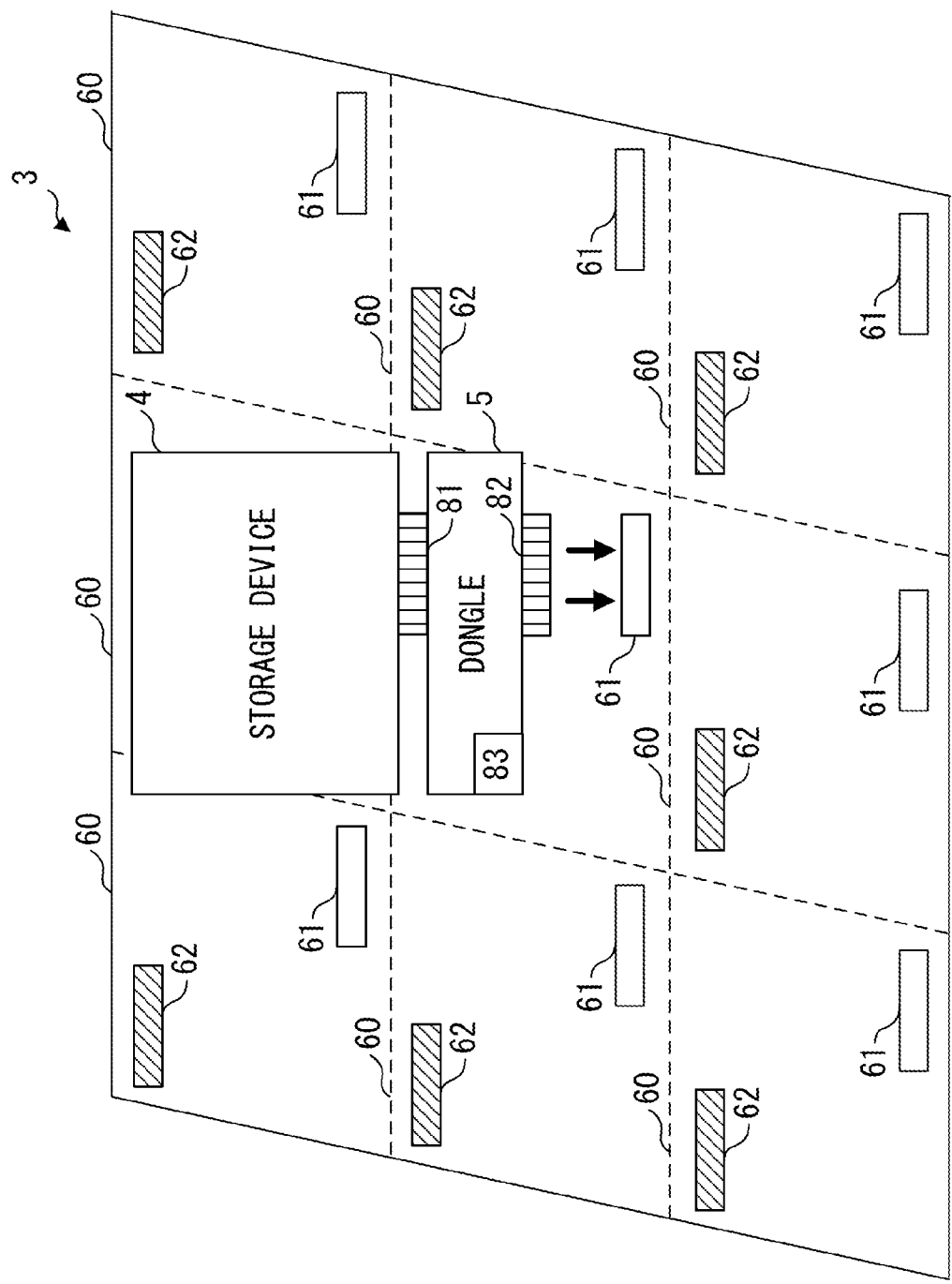
FIG. 4 is a diagram (1) explaining the implementation of the storage device.

FIG. 4 and FIG. 5 are diagrams explaining the implementation of the storage device.

With reference to FIG. 4, the process that implements the storage device 4 on the board 3 before the startup of the storage apparatus 200 is explained.

The storage device 4 is connected to the board 3 via a dongle 5.

The dongle 5 is equipped with a third connector 81, a fourth connector 82, and a fourth connection unit (fourth port) 83.

The third connector 81 is connected to a connector of the storage device 4 that is not illustrated in the drawing.

The fourth connector 82 is connected to the first connector and the second connector placed in the slot 60 on the board 3.

Then, before the startup of the storage apparatus 200, the storage device 4 is connected to the first connector 61 respectively via the dongle 5.

With reference to FIG. 5, a process in which the user implements the storage device 4 on the board 3 when a link-down occurs to the storage device 4 is explained.

When a link-down occurs between the first connection unit 4m and the storage device 4, the user removes the storage device 4 and the dongle 5 from the first connector 61, and the user makes the storage device 4 rotate 180 degrees to connect the storage device 4 and the dongle 5 to the second connector 62. On the board 3, the first connector 61 and the second connector 62 are point-symmetrically positioned, and therefore the storage device 4 to which the link-down has occurred may be implemented again in the slot 60 to which it was connected before the link-down.

Figure 6:
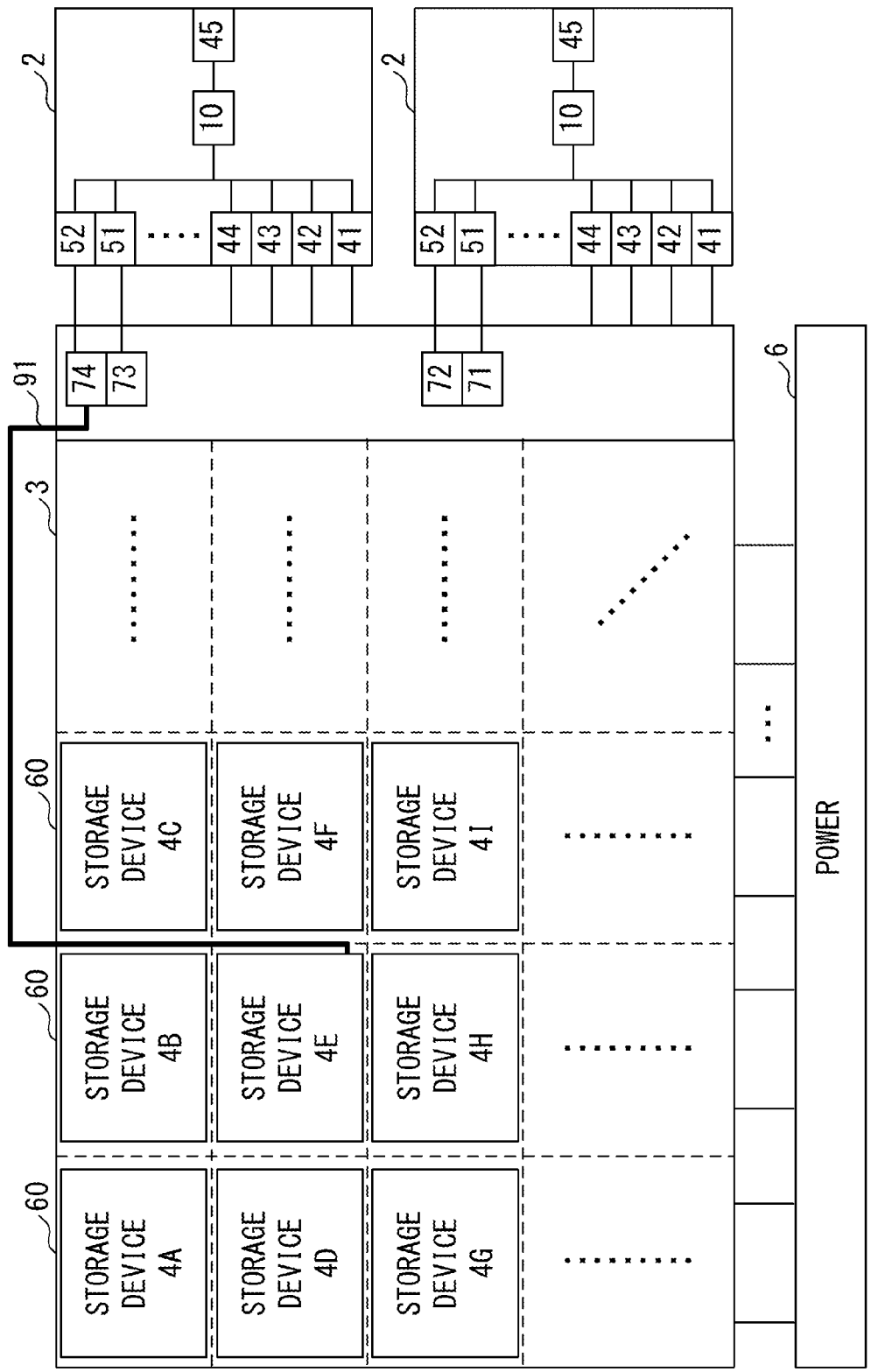
FIG. 6 is a diagram illustrating an example of the connection between the storage device and a second connection unit.

Then, the user connects the fourth connection unit 83 and the third connection unit 70 by the communication cable 91. Accordingly, for example, when the storage device 4 is a storage device 4E, the storage device 4E is connected to the second connection unit 52 via the fourth connection unit 83 and the third connection unit 74, and a link-up occurs to the storage device 4E, as illustrated in FIG. 6.

In addition, a process in which, when a link-down occurs to the storage device 4, the user implements another storage device 4 on the board 3 is explained.

When a link-down occurs between the first connection unit 4m and the storage device 4, the user connects another storage device 4 and the dongle 5 to the second connector 62. Then, the user connects the fourth connection unit 83 and the third connection unit 74 by the communication cable 91. Accordingly, for example, when the other storage device 4 is the storage device 4E, the storage device 4E is connected to the second connection unit 52 via the fourth connection unit 83 and the third connection unit 74 and a link-up occurs to the storage device 4E, as illustrated in FIG. 6.

Embodiment 1

With reference to FIG. 7 through FIG. 10, the outline of the relaying apparatus 2 according to Embodiment 1 is explained. In the explanation below, 0 through 61 stored in the first table 21 and the second table 31 are assumed to be first identifiers. Then, 0 through 61 stored in the first table 21 and the second table 31 respectively identify the first connection units 41 through 4n (n=61). In addition, 62 and 63 are assumed to be second identifiers. Then, 62 and 63 stored in the first table 21 and the second table 31 respectively identify the second connection units 51 and 52.

When the power 6 is turned to the ON state and the storage apparatus 200 is started up and a link-up occurs between a plurality of first connection units 4m and a plurality of storage devices 4, the relaying apparatus 2 obtains the address and the feature information of the storage device 4 from each storage device 4. Then, the relaying apparatus 2 associates the obtained address and the feature information with the first identifier that identifies the first connection unit 4m to which each of the storage devices 4 is connected, and the relaying apparatus 2 stores them in the first table 21, as illustrated in FIG. 7. The relaying apparatus 2 further stores the second identifier that identifies the second connection unit 5m in the first table, as illustrated in FIG. 7. Meanwhile, the obtaining of the address and the feature information of the storage device 4 by the relaying apparatus 2 may be performed by receiving an IDENTIFY frame reported from the storage device 4 to the relaying apparatus 2 when a link-up occurs to the storage device 4, for example.

In addition, when the storage apparatus 200 is started up, the relaying apparatus 2 stores the first identifier of the first connection unit 4m and the second identifier of the second connection unit 5m in the second table 31, as illustrated in FIG. 8.

When a failure occurs in the first connector 61, the relaying apparatus 2 detects a link-down between the first connection unit 4m and the storage device 4. Upon detecting a link-down of the first connection unit 42 identified by the first identifier 1, the relaying apparatus 2 deletes the address and the feature information associated with the first identifier 1 from the first table 21 as illustrated in FIG. 9, for example.

In addition, when a link-down occurs to the first connection unit 42, the relaying apparatus 2 associates the first identifier of the first connection unit 42 to which the link-down has occurred with the address of the storage device 4 to which the link-down has occurred and the link-down order, and the relaying apparatus 2 stores them in the second table 31, as illustrated in FIG. 10, for example. The link-down order is updated so that it becomes 1 for the first connection unit 4m to which a link-down occurred last, it becomes 2 for the first connection unit 4m to which a link-down occurred second-last, and it becomes 3 for the first connection unit 4m to which a link-down occurred third-last.

Then, when a link-up occurs to the second connection unit 5m, the relaying apparatus 2 searches for the address of the connected storage device 4 in the second table 31. When the address of the connected storage device 4 exists in the second table 31, the relaying apparatus 2 rewrites the second identifier of the second connection unit 5m into the first identifier in the first table 21 associated with the address. When the address of the connected storage device 4 does not exist in the second table 31, the relaying apparatus 2 rewrites the second identifier of the second connection unit 5m into the first identifier in the first table 21 associated with the link-down order 1.

With reference to FIG. 11 through FIG. 18, the process executed by the relaying apparatus 2 in which, when a link-down occurs to the first connection unit 42, the storage device 4 connected to the first connector 61 of the first connection unit 4m is connected to the second connector 62 and a link-up occurs to the second connection unit 52, is explained.

Figure 11:
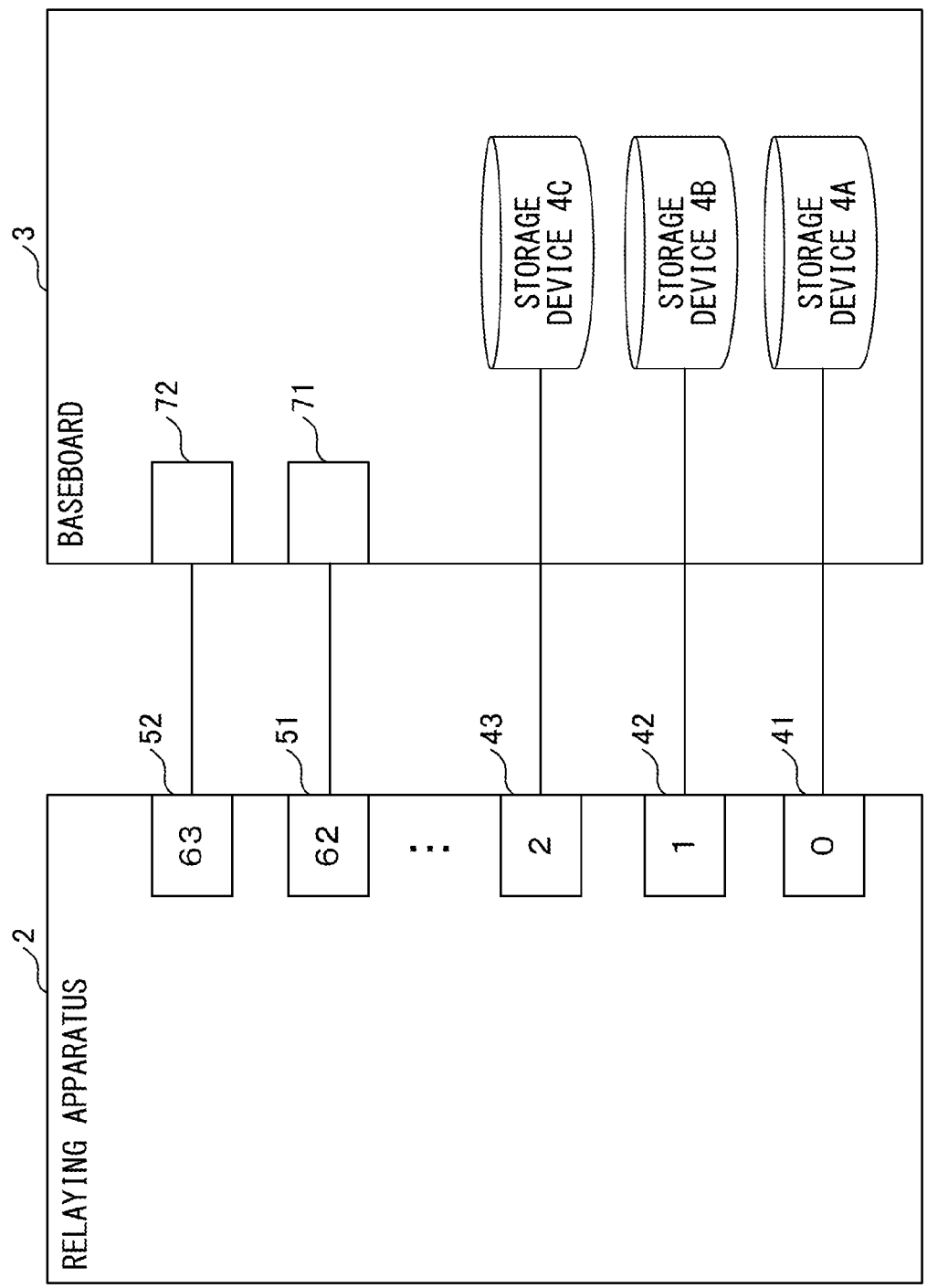
FIG. 11 is a diagram (1) illustrating the connection between a relaying apparatus and a storage device.

In the relaying apparatus 2, the first connection unit 41 is connected to the storage device 4A, the first connection unit 42 is connected to the storage device 4B, and the first connection unit 43 is connected to the storage device 4C by the user, for example, as illustrated in FIG. 11. Then, when the power 6 is turned to the ON state and the storage apparatus 200 is started up, the relaying apparatus 2 obtains the address and the feature information of the storage device 4 from the storage device 4. As illustrated in FIG. 12A, the relaying apparatus 2 associates and stores the obtained address, the feature information, and the first identifier of the storage device 4 in the first table 21. The relaying apparatus 2 further stores the first identifier of the first connection unit 4m and the second identifier of the second connection unit 5m in the second table 31, as illustrated in FIG. 12B. Meanwhile, the indication of the feature information is omitted in FIG. 12A, but it is assumed that feature information including a plurality of features is stored in the first table 21. The same applies to the first table 21 in the explanation below.

Figure 13:
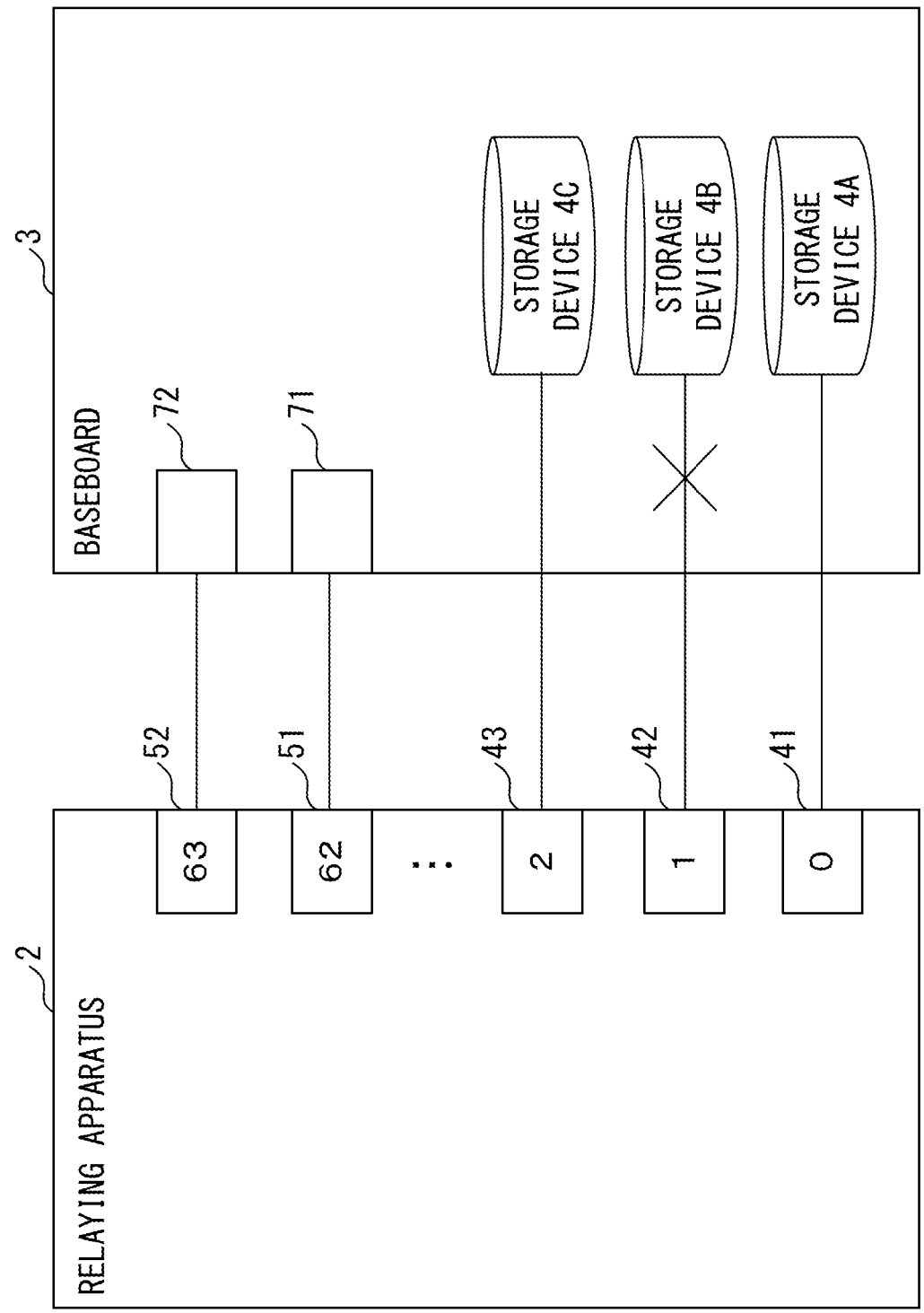
FIG. 13 is a diagram (2) illustrating the connection between the relaying apparatus and a storage device.

When a link-down occurs between the first connection unit 42 and the storage device 4B, as illustrated in FIG. 13, the relaying apparatus 2 deletes the address and the feature information associated with the first identifier 1 in the first table 21 that identifies the first connection unit 42, as illustrated in FIG. 14A. In addition, the relaying apparatus 2 associates and stores, in the second table 31, the first identifier 1 of the first connection unit 42, the address B of the storage device 4B, and the link-down order 1, as illustrated in FIG. 14B.

Figure 15:
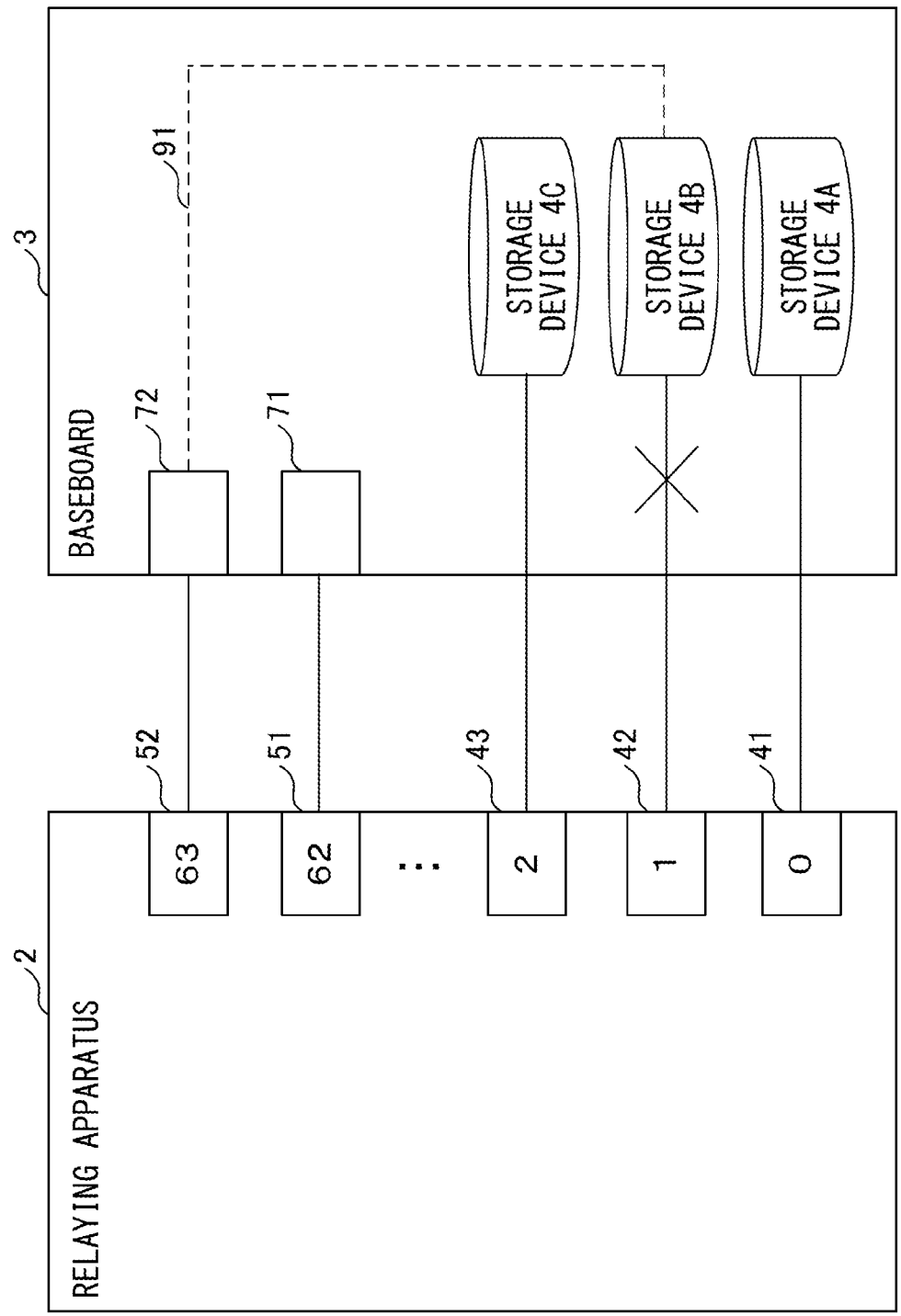
FIG. 15 is a diagram (3) illustrating the connection between a relaying apparatus and a storage device.

In the relaying apparatus 2, when the user connects the storage device 4B to the second connector 62 and the second connection unit 52 is connected to the storage device 4B via the third connection unit 72 and the communication cable 91, a link-up occurs between the second connection unit 52 and the storage device 4B, as illustrated in FIG. 15. Then, as illustrated in FIG. 16, the relaying apparatus 2 associates and stores a second identifier 63 in the first table 21 that identifies the second connection unit 52 with the address B of the storage device 4B to which the link-up has occurred.

Then, the relaying apparatus 2 performs a search as to whether or not the address B of the storage device 4B to which the link-up has occurred exists in the second table 31 in FIG. 14B.

Upon extracting the address B of the storage device 4B to which the link-up has occurred from the second table 31, the relaying apparatus 2 deletes, from the second table 31, the record corresponding to the first identifier 1 of the storage device 4B to which a link-up has occurred, as illustrated in FIG. 17A.

The relaying apparatus 2 further changes the second identifier 63 in the first table 21 associated with the address B of the storage device 4B to which the link-up has occurred into the first identifier 1 associated with the address B extracted in FIG. 14B, as illustrated in FIG. 17A.

In addition, the relaying apparatus 2 deletes the record corresponding to the first identifier 1 in the second table 31, as illustrated in FIG. 17B. The relaying apparatus 2 further changes the identifier 63 in the second table 31 into the first identifier 1 associated with the address B extracted in FIG. 14B, as illustrated in FIG. 17B.

Figure 18:
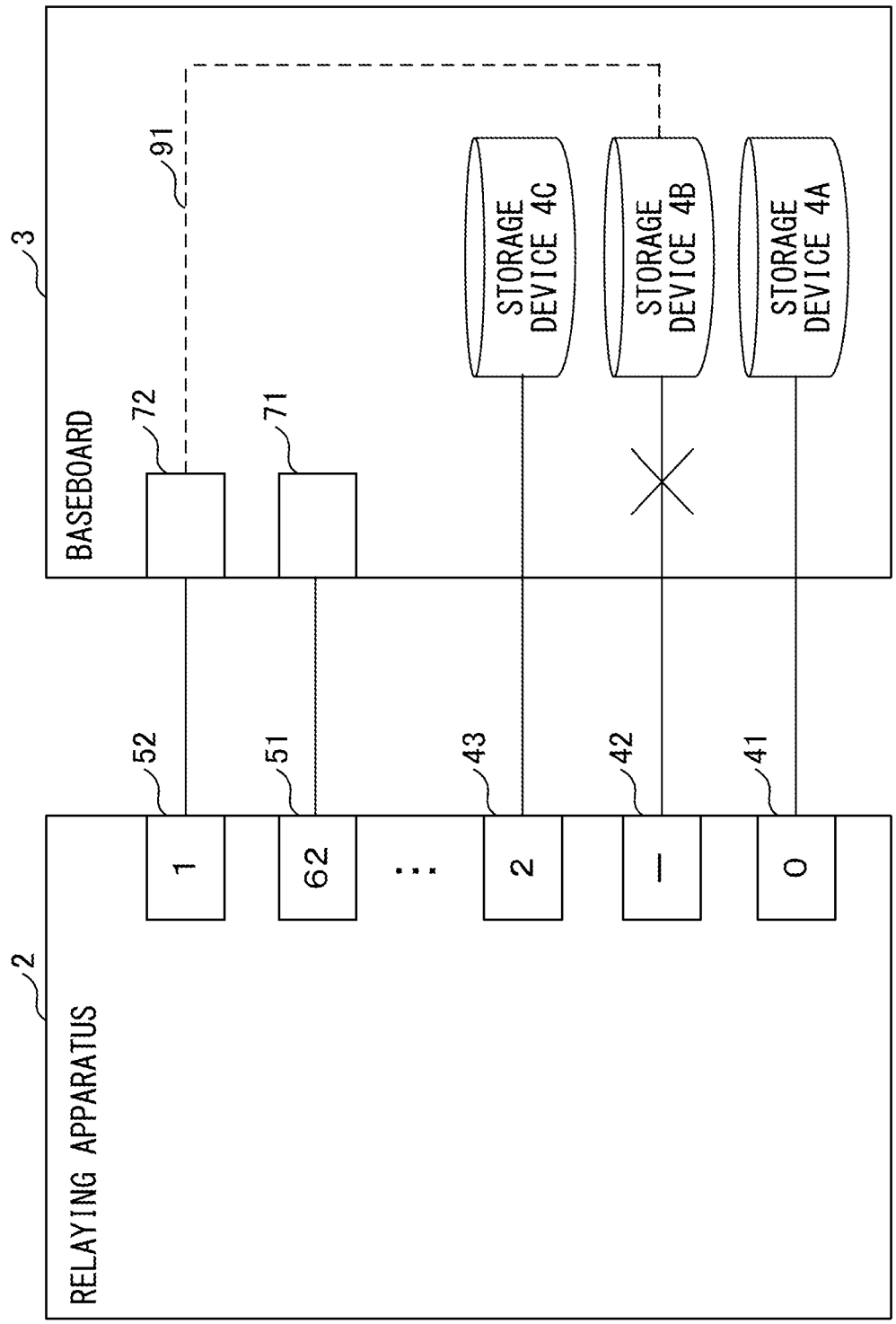
FIG. 18 is a diagram (4) illustrating the connection between a relaying apparatus and a storage device.

According to the above, in the relaying apparatus 2, the second connection unit 52 starts to be identified by the first identifier 1. Then, the storage device 4B to which the link-up has occurred is connected to the connection unit identified by the first identifier 1, as illustrated in FIG. 18. Therefore, the higher-order apparatuses are able to access the storage device 4B in the same manner as before the link-down.

With reference to FIG. 19 through FIG. 26, the process performed by the relaying apparatus 2 in which, when a link-down occurs between the first connection unit 42 and the storage device 4B, another storage device 4α is connected to the second connector 62, and a link-up is made for the second connection unit 51, is explained. In addition, the process of the relaying apparatus 2 in which, when a link-down occurs between the first connection unit 43 and the storage device 4C, another storage device 4β is connected to the second connector 62, and a link-up is made for the second connection unit 52, is explained. In the explanation below, the explanation is given assuming that a link-down occurs to the first connection unit 42, and after that, that a link-down occurs to the first connection unit 43.

Figure 19:
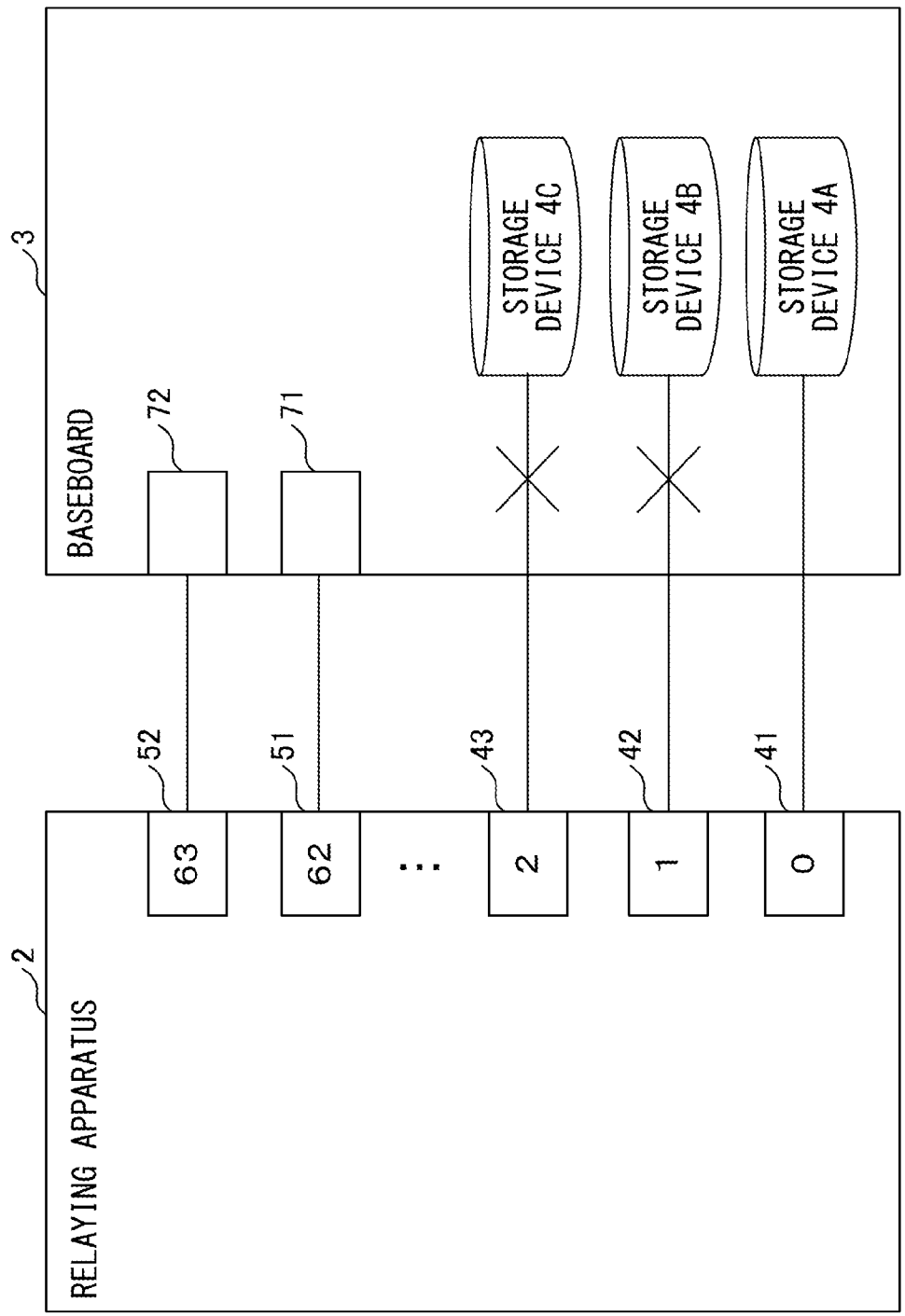
FIG. 19 is a diagram (5) illustrating the connection between a relaying apparatus and a storage device.

As illustrated in FIG. 19, in the relaying apparatus 2, a link-down occurs between the first connection unit 42 and the storage device 4B and between the first connection unit 43 and the storage device 4C due to a failure or the like of the first connector 61. Then, the relaying apparatus 2 deletes the address and the feature information in the first table 21 associated with the first identifier 1 that identifies the first connection unit 42 and the first identifier 2 that identifies the first connection unit 43, as illustrated in FIG. 20A.

In addition, as illustrated in FIG. 20B, the relaying apparatus 2 associates and stores the first identifier 1 of the first connection unit 42, the address B of the storage device 4B to which the link-down has occurred, and the link-down order in the second table 31. The relaying apparatus 2 further associates and stores the first identifier 2 of the first connection unit 43 the address C of the storage device 4C to which the link-down has occurred, and the link-down order in the second table 31, as illustrated in FIG. 20B. Here, the link-down order associated with the first identifier 1 that identifiers the first connection unit 42 to which a link-down occurred first is 2, because a link-down occurred to the first connection unit 42, and after that, that a link-down occurred to the first connection unit 43.

Figure 21:
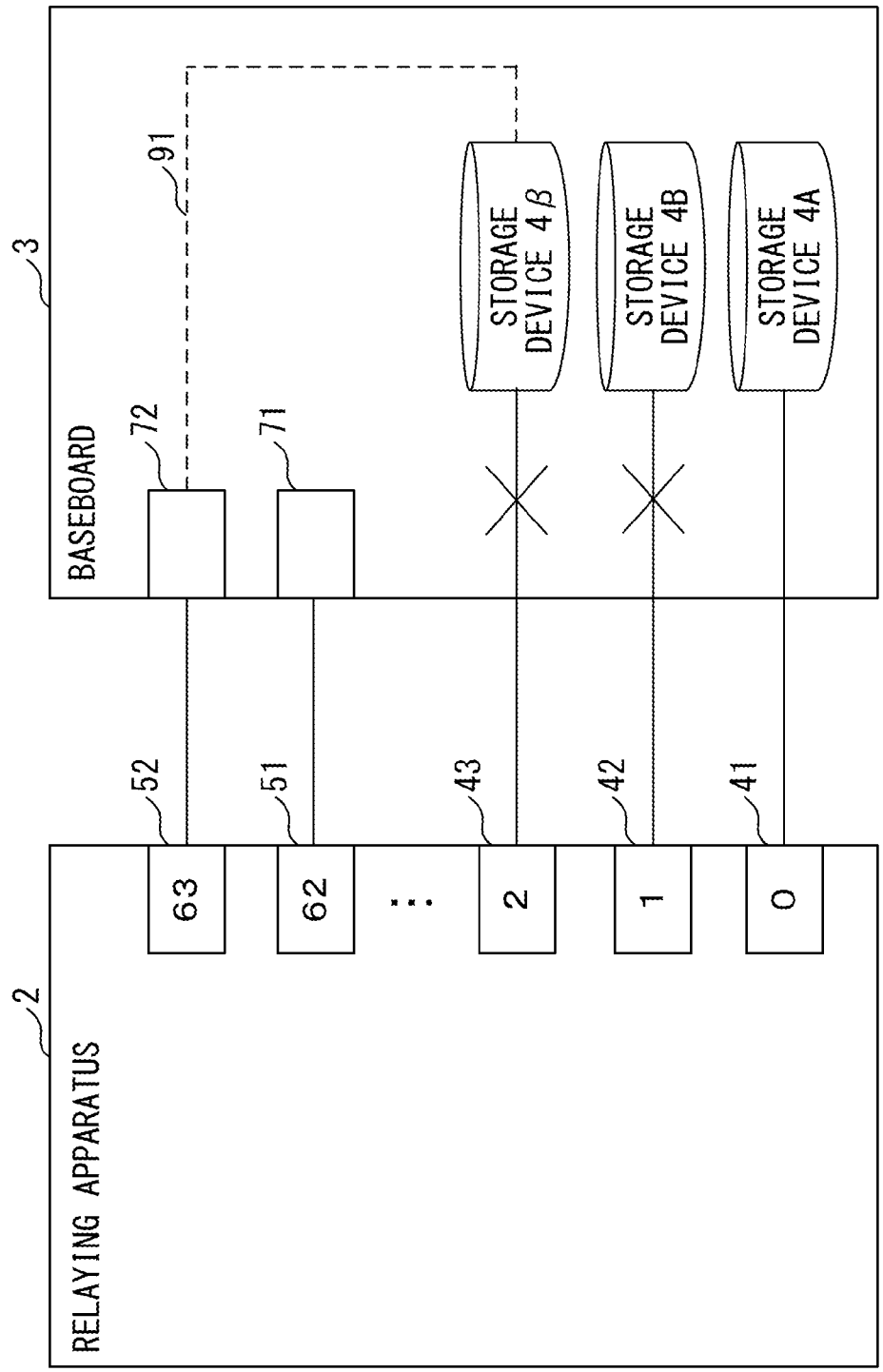
FIG. 21 is a diagram (6) illustrating the connection between a relaying apparatus and a storage device.

As illustrated in FIG. 21, in the relaying apparatus 2, when the user connects the storage device 4β to the second connector 62 and the second connection unit 52 is connected to the storage device 4β via the third connection unit 72 and the communication cable 91, a link-up occurs between the second connection unit 52 and the storage device 4β. Then, as illustrated in FIG. 22, the relaying apparatus 2 associates and stores the second identifier 63 in the first table 21 that identifies the second connection unit 52 with the address β of the storage device 4β to which the link-up has occurred.

Then, the relaying apparatus 2 performs a search as to whether the address β of the storage device 4β to which the link-up has occurred exists in the second table 31 in FIG. 20B.

The relaying apparatus 2 judges that the address β of the storage device 4β to which the link-up has occurred does not exist in the second table 31 in FIG. 20B. Then, as illustrated in FIG. 23A, the relaying apparatus 2 replaces the second identifier 63 in the first table 21 with the first identifier 2 associated with the link-down order 1 in the second table 31 in FIG. 20B. In addition, the relaying apparatus 2 deletes the record corresponding to the first identifier 2 for which the address and the feature information have been deleted from the first table 21 as illustrated in FIG. 23A.

The relaying apparatus 2 further replaces the second identifier 63 in the second table 31 with the first identifier 2 associated with the link-down order 1 in the second table 31 in FIG. 20B, as illustrated in FIG. 23B. In addition, the relaying apparatus 2 deletes the record associated with the link-down order 1, as illustrated in FIG. 23B. Then, the relaying apparatus 2 changes the link-down order associated with the first identifier 1 to 1, as illustrated in FIG. 23B.

As illustrated in FIG. 24, in the relaying apparatus 2, when the user connects the storage device 4α to the second connector 62 and the second connection unit 51 is connected to the storage device 4α via the third connection unit 71 and the communication cable 92, a link-up occurs between the second connection unit 51 and the storage device 4α. Then, as illustrated in FIG. 25, the relaying apparatus 2 associates and stores the second identifier 63 in the first table 21 that identifies the second connection unit 51 with the address α of the storage device 4α to which the link-up has occurred.

Then, the relaying apparatus 2 performs a search as to whether the address α of the storage device 4α to which the link-up has occurred exists in the second table 31 in FIG. 23B.

The relaying apparatus 2 judges that the address α of the storage device 4α to which the link-up has occurred does not exist in the second table 31 in FIG. 23B. Then, the relaying apparatus 2 replaces the second identifier 63 in the first table 21 with the first identifier 1 in the second table 31 in FIG. 23B associated with the link-down order 1, as illustrated in FIG. 26A. In addition, the relaying apparatus 2 deletes the record corresponding to the first identifier 1 for which the address and the feature information have been deleted, as illustrated in FIG. 26A.

Furthermore, the relaying apparatus 2 replaces the second identifier 63 in the second table 31 with the first identifier 1 in the second table 31 in FIG. 23B associated with the link-down order 1, as illustrated in FIG. 26B. Then, the relaying apparatus 2 deletes the record associated with the link-down order 1, as illustrated in FIG. 26B.

According to the above, the writing unit 12 associates the first identifier associated with the order specified by the link-down order with the address of the storage device 4 to which a link-up has occurred, and the writing unit 12 writes them into the first table 21. Accordingly, when the user connects another storage device 4 that has features that are equivalent to those of the failed storage device 4 to the second connection unit 5m according to the link-down order, the first identifier of the failed storage device 4 is associated with the connected other storage device 4. Therefore, the higher-order apparatuses may operate the storage apparatus 200 in the same manner as before the link-down.

Embodiment 2

When the user connects the storage devices 4 according to the link-down order and the user makes a mistake in the order to connect the storage devices 4, the order of the identifiers of the respective storage devices 4 becomes wrong. In order to avoid a problem like this caused by the operation of the user, in the relaying apparatus 2 according to Embodiment 2, the second table 31 that stores feature information is used. The relaying process using the second table 31 that stores feature information is explained below.

When a link-down occurs to the first connection unit 4m, the relaying apparatus 2 obtains the address and the feature information of the storage device 4 to which the link-down has occurred. Then, the relaying apparatus 2 stores the obtained feature information in the second table 31 arranged in order from a feature of a type that has a larger influence on the operation of the storage apparatus 200 with a change of the storage device 4, as illustrated in FIG. 27.

When a link-up occurs to the storage device 4 and the same address as the address of the storage device 4 does not exist in the second table 31, the relaying apparatus 2 compares the features stored in the second table 31 with the features of the storage device 4 in order from a feature of a type that has a larger influence on the operation of the storage apparatus 200. When a feature that corresponds to a feature of the storage device 4 is extracted from the second table 31, the relaying apparatus 2 replaces the second identifier associated with the address of the storage device 4 to which the link-up has occurred with the first identifier associated with the extracted feature, in the first table 21.

With reference to FIG. 28 through FIG. 33, the process executed in the relaying apparatus 2 when the user makes a mistake in the connection order of the storage devices 4 is explained. In the explanation below, it is assumed that a link-down occurs in the first connection unit 42, and after that, that a link-down occurs in the first connection unit 43. Meanwhile, the connection of the storage devices 4 according to the link-down order is assumed to be the procedure explained with reference FIG. 19 through FIG. 26.

Figure 28:
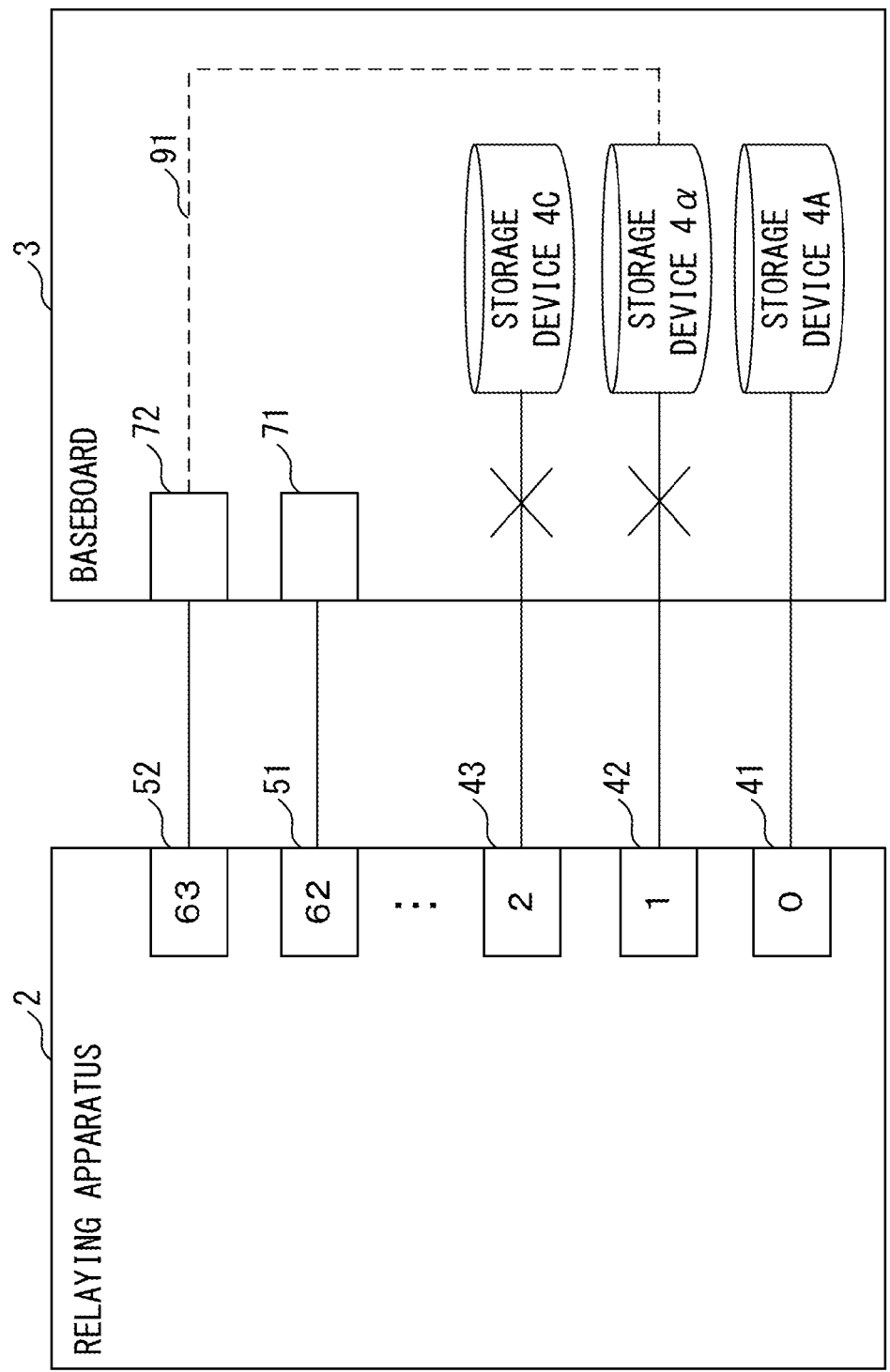
FIG. 28 is a diagram (8) illustrating the connection between a relaying apparatus and a storage device.

As illustrated in FIG. 28, when the user connects the storage device 4α to the second connector 62 and the second connection unit 52 is connected to the storage device 4α via the third connection unit 72 and the communication cable 91, a link-up occurs between the second connection unit 52 and the storage device 4α. Then, as illustrated in FIG. 29A, the relaying apparatus 2 associates and stores the address α of the storage device 4α to which the link-up has occurred with the second identifier 63 in the first table 21 that identifies the second connection unit 52.

Then, the relaying apparatus 2 performs a search as to whether or not the address α of the storage device 4α to which the link-up has occurred exists in the second table 31 in FIG. 29B in which the identifier, the address, and the link-down order of the storage device 4 to which the link-down has occurred are associated and stored.

The relaying apparatus 2 judges that the address α of the storage device 4α to which the link-up has occurred does not exist in the second table 31 in FIG. 29B. Then, the relaying apparatus 2 replaces the second identifier 63 in the first table 21 with the first identifier 2 in the second table 31 in FIG. 29B associated with the link-down order 1, as illustrated in FIG. 30A. In addition, the relaying apparatus 2 deletes the record corresponding to the first identifier 2 for which the address and the feature information have been deleted, as illustrated in FIG. 30A.

The relaying apparatus 2 further replaces the second identifier 63 in the second table 31 with the first identifier 2 in the second table 31 in FIG. 30B associated with the link-down order 1, as illustrated in FIG. 30B. Then, the relaying apparatus 2 deletes the record associated with the link-down order 1, as illustrated in FIG. 30B. Then, the relaying apparatus 2 changes the link-down order associated with the first identifier 1 to 1, as illustrated in FIG. 30B.

Figure 31:
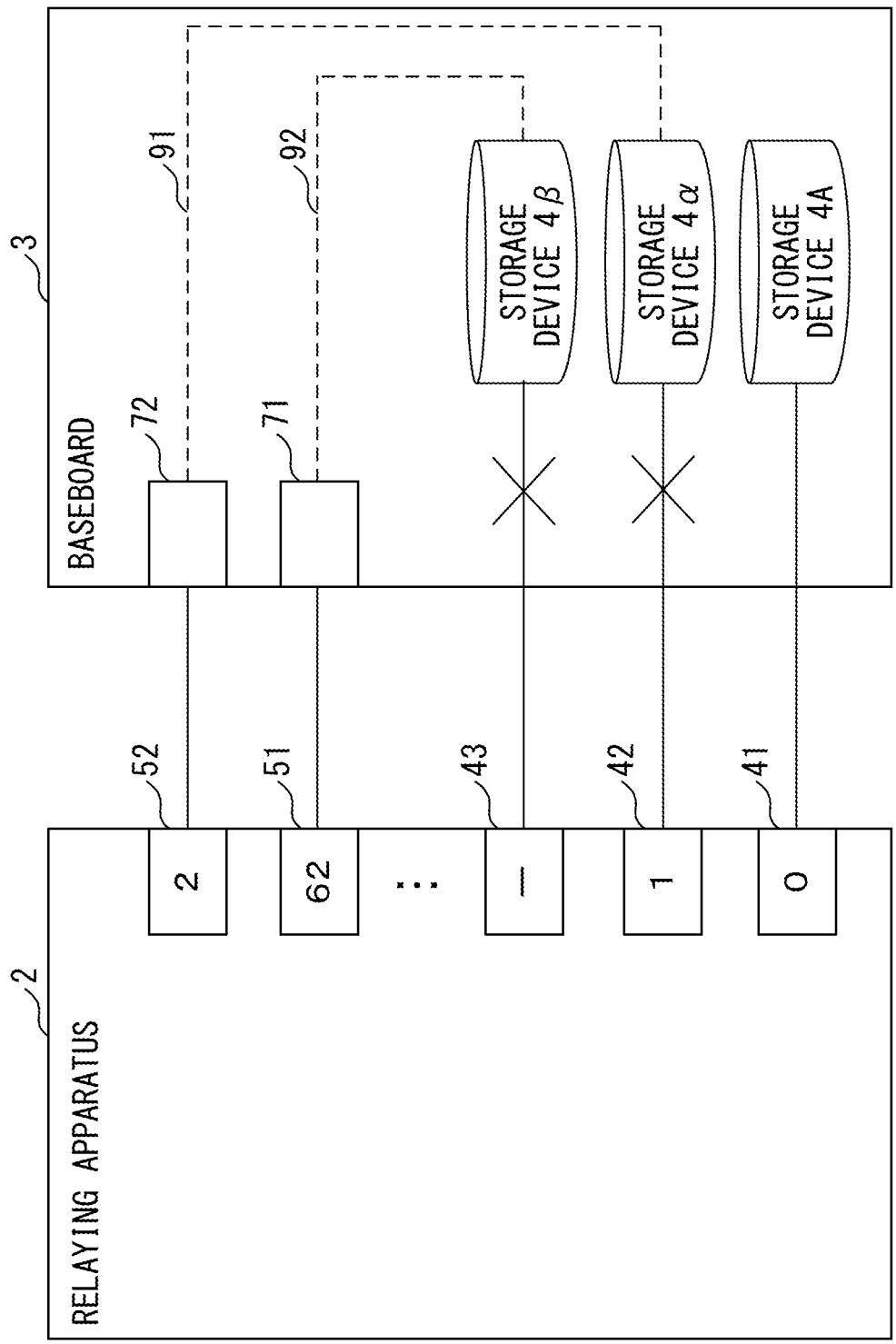
FIG. 31 is a diagram (9) illustrating the connection between a relaying apparatus and a storage device.

Next, as illustrated in FIG. 31, in the relaying apparatus 2, when the user connects the storage device 4β to the second connector 62 and the second connection unit 51 is connected to the storage device 4β via the third connection unit 71 and the communication cable 92, a link-up occurs between the second connection unit 51 and the storage device 4β. Then, as illustrated in FIG. 32, the relaying apparatus 2 associates and stores the second identifier 62 in the first table 21 that identifies the second connection unit 51 with the address β of the storage device 4β to which the link-up has occurred.

Then, the relaying apparatus 2 performs a search as to whether or not the address β of the storage device 4β to which the link-up has occurred exists in the second table 31 in FIG. 30B.

The relaying apparatus 2 judges that the address β of the storage device 4β to which the link-up has occurred does not exist in the second table 31 in FIG. 30B. Then, as illustrated in FIG. 33A, the relaying apparatus 2 replaces the second identifier 62 in the first table 21 with the first identifier 1 in the second table 31 in FIG. 30B associated with the link-down order 1. In addition, as illustrated in FIG. 33A, the relaying apparatus 2 deletes the record corresponding to the first identifier 1 for which the address and the feature information have been deleted.

The relaying apparatus 2 further replaces the second identifier 62 in the second table 31 with the first identifier 1 in the second table 31 in FIG. 30B associated with the link-down order 1, as illustrated in FIG. 33B. Then, the relaying apparatus 2 deletes the record associated with the link-down order 1, as illustrated in FIG. 33B.

As described above, when the storage device 4α and the storage device 4β are not connected to the board 3 according to the link-down order due to a mistake made by the user in the procedure, the order of the identifiers of the storage devices 4 becomes wrong, and it becomes impossible for the higher-order apparatuses to operate the storage apparatus 200 in the same manner as before the link-down.

The relaying process that uses the second table 31 that stores feature information in order to solve such a problem is explained.

With reference to FIG. 7, FIG. 19, FIG. 28, and FIG. 34 through FIG. 38, the process performed by the relaying apparatus 2 when feature information is stored in the second table 31 is explained below. In the explanation below, it is assumed that a link-down occurs in the first connection unit 42, and after that, that a link-down occurs in the first connection unit 43.

As illustrated in FIG. 19, when a link-down occurs to the first connection unit 42, the relaying apparatus 2 obtains the address B and the feature information of the storage device 4B from the first table 21 illustrated in FIG. 7. Then, as illustrated in FIG. 34, the relaying apparatus 2 associates and stores, in the second table, the obtained address, the feature information, and the link-down order with the first identifier 1 that identifies the first connection unit 42. In addition, as illustrated in FIG. 36, the relaying apparatus 2 deletes the address and the feature information associated with the first identifier 1 from the first table 21.

When a link-down occurs to the first connection unit 43, the relaying apparatus 2 further obtains the address C and the feature information of the storage device 4C from the first table 21, as illustrated in FIG. 19. Then, as illustrated in FIG. 35, the relaying apparatus 2 associates and stores, in the second table, the obtained address, the feature information, and the link-down order with the first identifier 2 that identifiers the first connection unit 43. Then, the relaying apparatus 2 deletes the address and the feature information associated with the first identifier 2 from the first table 21, as illustrated in FIG. 36.

As illustrated in FIG. 28, in the relaying apparatus 2, when the user connects the storage device 4α to the second connector 62 and the second connection unit 52 is connected to the storage device 4α via the third connection unit 72 and the communication cable 91, a link-up occurs between the second connection unit 52 and the storage device 4α.

Then, the relaying apparatus 2 obtains the address α and the feature information of the storage device 4α, and as illustrated in FIG. 36, the relaying apparatus 2 associates and stores the second identifier 63 in the first table 21 that identifies the second connection unit 52 with the obtained address α and the feature information.

Then, the relaying apparatus 2 performs a search as to whether or not the address α of the storage device 4α to which the link-up has occurred exists in the second table 31 in FIG. 35.

The address α of the storage device 4α to which the link-up has occurred is not extracted from the second table 31 in FIG. 35, and therefore, the relaying apparatus 2 searches for a feature that corresponds to a feature of the storage device 4α to which the link-up has occurred from FIG. 35.

First, the type has the largest influence on the operation, and therefore, the relaying apparatus 2 searches for the type that corresponds to the type of the storage device 4α from the second table 31 in FIG. 35. The type aaaa of the storage device 4α is not extracted from the second table 31, and the capacity has the next largest influence on the operation, and therefore, the relaying apparatus 2 searches for the capacity that corresponds to the capacity of the storage device 4α from the second table 31 in FIG. 35. As a result, the relaying apparatus 2 extracts the capacity 600 GB that corresponds to the capacity 600 GB of the storage device 4α from the second table 31. Then, the relaying apparatus 2 rewrites the second identifier 63 in the first table 21 into the first identifier 1 in the second table 31 associated with the capacity 600 GB, as illustrated in FIG. 37. In addition, the relaying apparatus 2 deletes the record corresponding to the first identifier 1 for which the address and the feature information have been deleted from the first table 21, as illustrated in FIG. 37.

Then, as illustrated in FIG. 38, the relaying apparatus 2 deletes the record associated with the identifier 1 in the second table 31. As illustrated in FIG. 38, the relaying apparatus 2 further rewrites the second identifier 63 in the second table 31 into the first identifier 1. By repeating similar processes, the relaying apparatus 2 associates storage devices 4 to which a link-up has occurred with first identifiers.

According to the above, the relaying apparatus 2 automatically associates first identifiers with storage devices 4 to which a link-up has occurred, according to the features of the storage device 4, and therefore, a problem wherein the order of the identifiers of the respective storage devices 4 becomes wrong due to a mistake made by the user in the order of connection of the storage devices 4 may be avoided.

FIG. 39 through FIG. 43 are flowcharts illustrating the processes performed by the relaying apparatus.

With reference to FIG. 39 through FIG. 43, the processes of the relaying apparatus 2 are explained. In the explanation below, it is assumed that feature information includes the type and the capacity. In addition, it is assumed that the type has a larger influence on the operation than the influence of the capacity.

Figure 39:
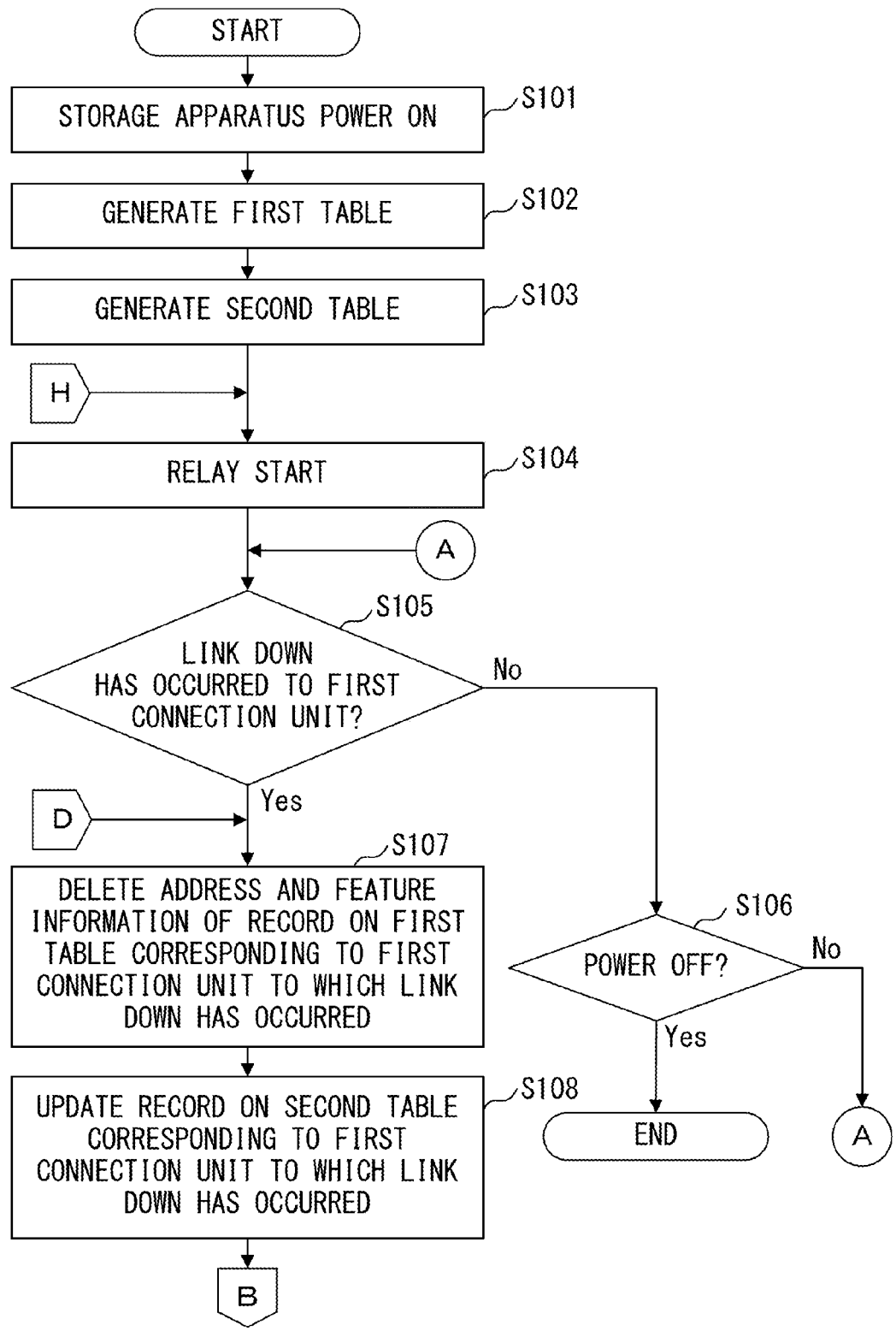
FIG. 39 is a flowchart illustrating processes performed by a relaying apparatus (1)

An explanation is given with reference to FIG. 39.

When the power 6 is turned to the ON state and the storage apparatus 200 is started up (S101), the relaying apparatus 2 obtains the address and the feature information of the respective connected storage devices 4. Then, the relaying apparatus 2 generates the first table 21 in which the first identifier of the first connection unit 4m provided in the relaying apparatus 2, the address of the connected storage device 4, and the feature information of the connected storage device 4 are associated. In addition, the relaying apparatus 2 stores the identifier of the second connection unit 5m in the first table 21 (S102).

The relaying apparatus 2 further generates the second table 31 that stores identifiers of the first connection unit 4m provided in the relaying apparatus 2 and the second connection unit 5m (S103).

Then, the relaying apparatus 2 starts the data relaying process between the host 100 and the storage device (S104). When an access request with an attached first identifier is given from the control apparatus 330, for example, the relaying apparatus 2 refers to the first table 21, and the relaying apparatus 2 forwards data via the connection unit corresponding to the first identifier.

The relaying apparatus 2 judges whether or not a link-down has occurred to the first connection unit 4m (S105). When a link-down has not occurred to the first connection unit 4m (S105, No), the relaying unit repeats the process in S105 until the power 6 supplied to the storage apparatus 200 turns to the OFF state (S106, No).

When a link-down has not occurred to the first connection unit 4m (S105, No), and the power 6 supplied to the storage apparatus 200 turns to the OFF state (S106, Yes), the relaying apparatus 2 terminates the relaying process. Meanwhile, the relaying apparatus 2 may also terminate the relaying process in the middle of another process when the power 6 turns to the OFF state, not only in S106.

When the relaying apparatus 2 judges in S105 that a link-down has occurred to the first connection unit 4*m* (S105, Yes), the relaying apparatus 2 deletes the address and the feature information of the record on the first table 21 corresponding to the first connection unit 4*m* to which the link-down has occurred (S107).

The relaying apparatus 2 updates the record on the second table 31 corresponding to the first connection unit 4*m* to which the link-down has occurred (S108). The relaying apparatus 2 stores, in the second table 31, the address and the feature information of the storage device 4 that was connected to the first connection unit 4*m* to which the link-down has occurred, for example. Then, the relaying apparatus 2 executes the process in S201.

Figure 40:
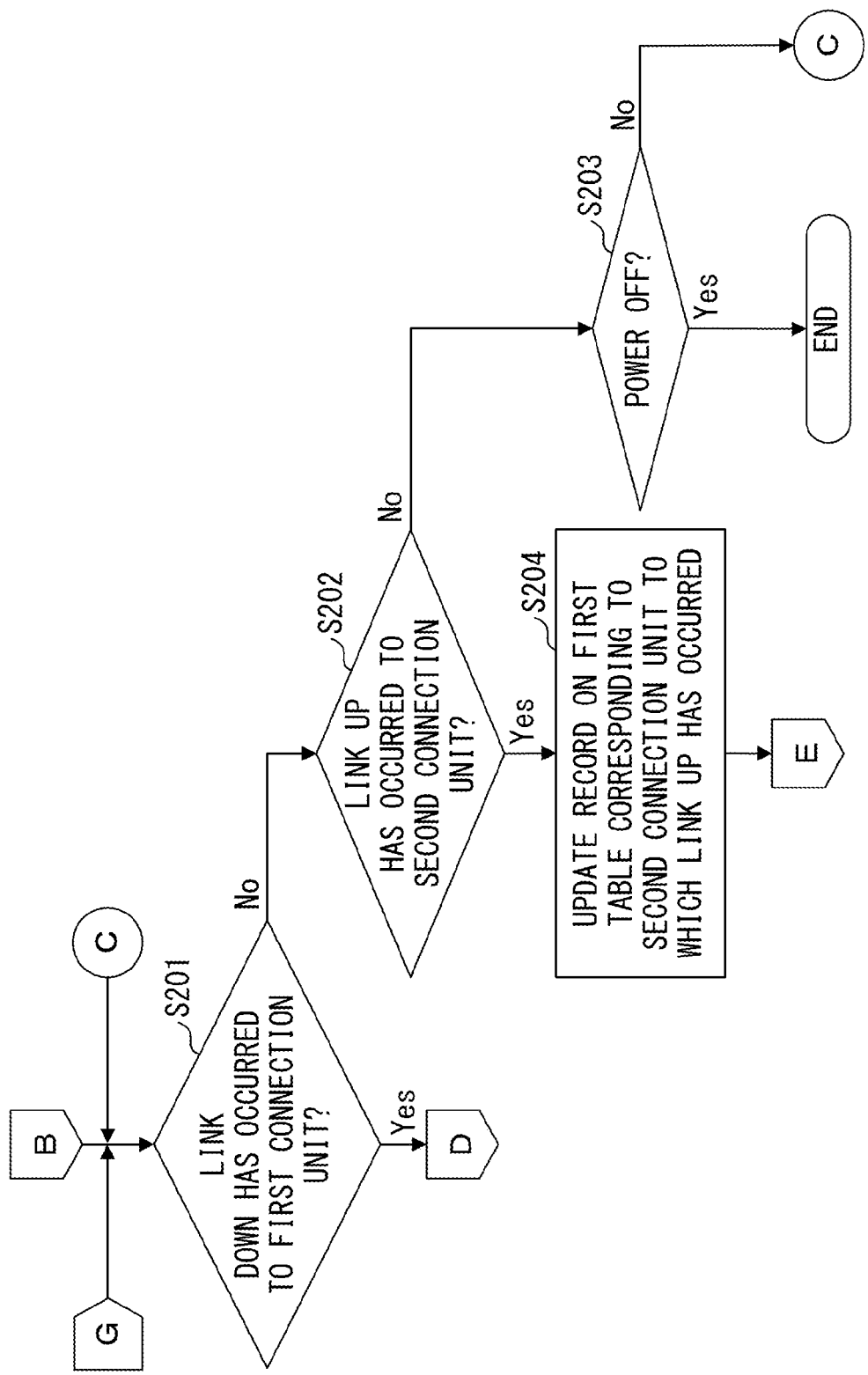
FIG. 40 is a flowchart illustrating processes performed by of a relaying apparatus (2)

An explanation is given with reference to FIG. 40.

The relaying apparatus 2 further judges whether or not a link-down has occurred to another first connection unit 4*m* (S201). When a link-down has not occurred to the first connection unit 4*m* (S201, No), the relaying apparatus 2 judges whether or not a link-up has occurred to the second connection unit 5*m* (S202).

When a link-up has not occurred to the second connection unit 5*m* (S202, No), and the power 6 supplied to the storage apparatus 200 is not in the OFF state (S203, No), the relaying unit executes the process in S201.

When a link-up has not occurred to the second connection unit 5*m* (S202, No), and the power 6 supplied to the storage apparatus 200 turns to the OFF state (S203, Yes), the relaying unit terminates the process. Meanwhile, the relaying apparatus 2 may also terminate the relaying process in the middle of another process when the power 6 turns to the OFF state, not only in S203.

In S201, when a link-down has occurred to the first connection unit 4*m* (S201, Yes), the relaying apparatus 2 executes the process in S107.

In S202, when a link-up has occurred to the second connection unit 5*m* (S202), the relaying apparatus 2 updates the record on the first table 21 corresponding to the second connection unit 5*m* to which the link-up has occurred (S204). Then, the relaying apparatus 2 executes the process in S301. The relaying apparatus 2 associates and stores the address and the feature information of the storage device 4 that was connected to the second connection unit 5*m* to which the link-up occurred with the second identifier of the second connection unit 5*m* to which the link-up occurred on the first table 21, for example.

Figure 41:
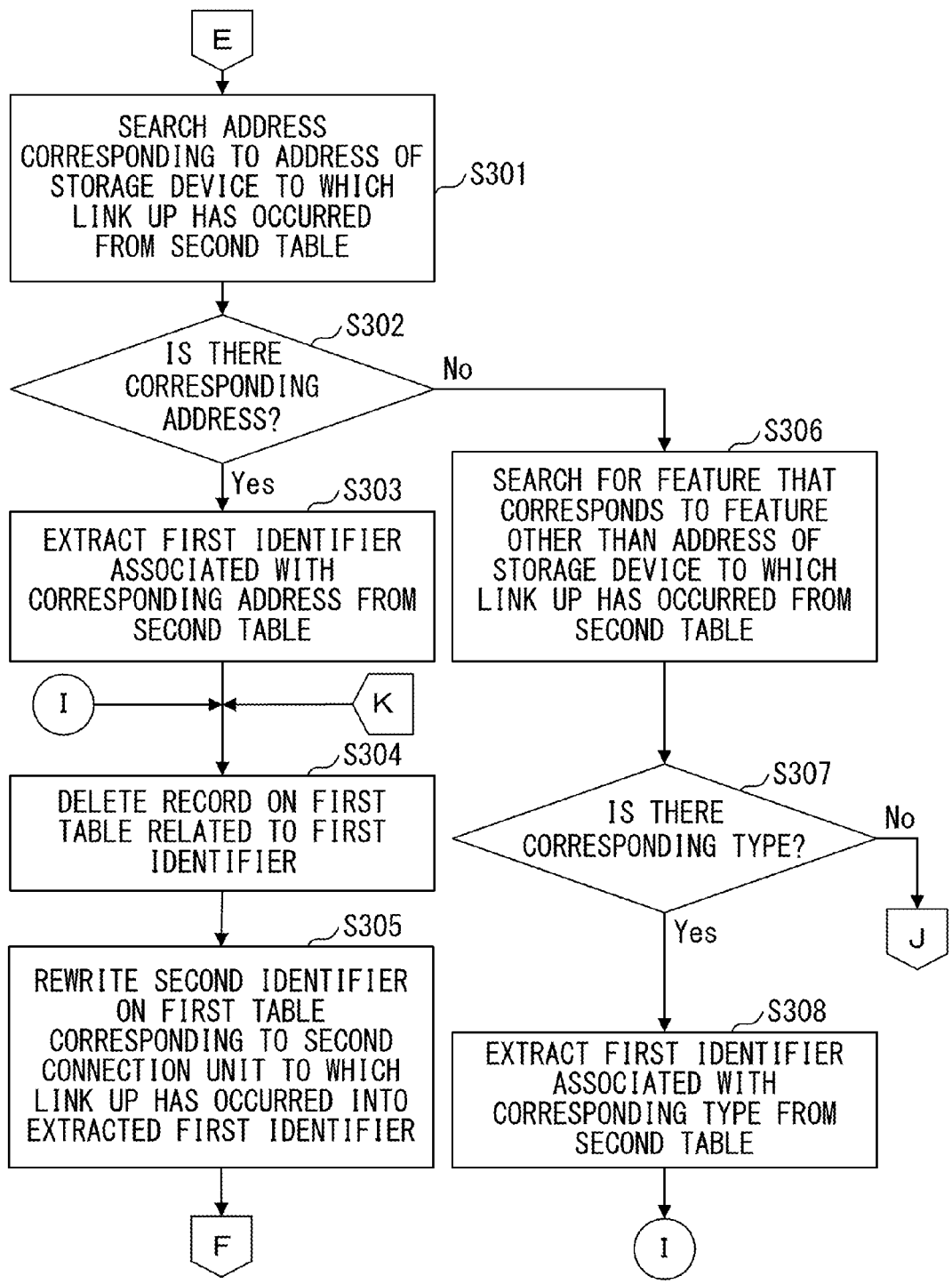
FIG. 41 is a flowchart illustrating processes performed by of a relaying apparatus (3)

An explanation is given with reference to FIG. 41.

The relaying apparatus 2 searches for the address corresponding to the address of the storage device 4 to which the link-up has occurred from the second table 31 (S301). Then, when the address corresponding to the address of the storage device 4 to which the link-up has occurred exists in the second table 31 (S302, Yes), the relaying apparatus 2 extracts the first identifier associated with the corresponding address from the second table 31 (S303).

Then, the relaying apparatus 2 deletes the record related to the first identifier on the first table 21 (S304).

The relaying apparatus 2 further rewrites the second identifier on the first table 21 corresponding to the second connection unit 5*m* to which the link-up has occurred into the extracted first identifier (S305). Then, the relaying apparatus 2 executes the process in S401.

Figure 42:
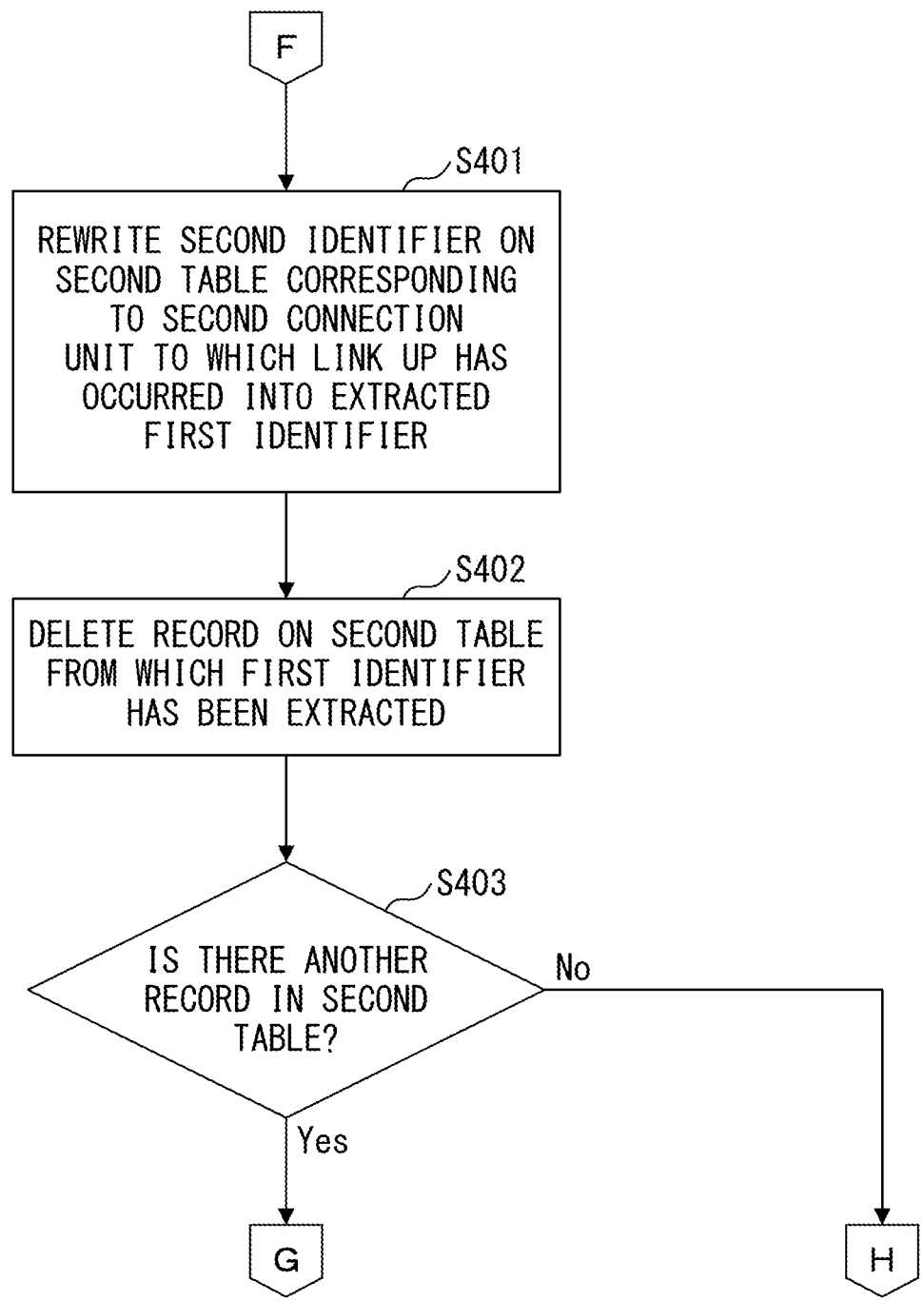
FIG. 42 is a flowchart illustrating processes performed by of a relaying apparatus (4)

An explanation is given with reference to FIG. 42.

The relaying apparatus 2 rewrites the second identifier on the second table 31 corresponding to the second connection unit 5*m* to which the link-up has occurred into the extracted first identifier (S401).

The relaying apparatus 2 deletes the record on the second table 31 from which the first identifier has been extracted (S402).

The relaying apparatus 2 judges whether or not information of the first connection unit 4*m* to which the link-down has occurred is stored in another record in the second table 31 (S403).

When information of the first connection unit 4*m* to which the link-down has occurred is stored in another record in the second table 31 (S403, Yes), the relaying apparatus 2 executes the process in S201.

When information of the first connection unit 4*m* to which the link-down has occurred is not stored in another record in the second table 31 (S403, No), the relaying apparatus 2 executes the process in S104.

An explanation is given with reference to FIG. 41.

In S302, when the address that corresponds to the address of the storage device 4 to which the link-up has occurred does not exist in the second table 31 (S302, No), the relaying apparatus 2 searches for a feature that corresponds to a feature other than the address of the storage device 4 to which the link-up has occurred from the second table 31 (S306).

Then, when the type that corresponds to the type of the storage device 4 to which the link-up has occurred exists in the second table 31 (S307, Yes), the relaying apparatus extracts the first identifier associated with the corresponding type from the second table 31 (S308). Then, the relaying apparatus 2 executes the process in S304.

When the type that corresponds to the type of the storage device 4 to which the link-up has occurred does not exist in the second table 31 (S307, No), the relaying apparatus 2 executes the process in S501.

Figure 43:
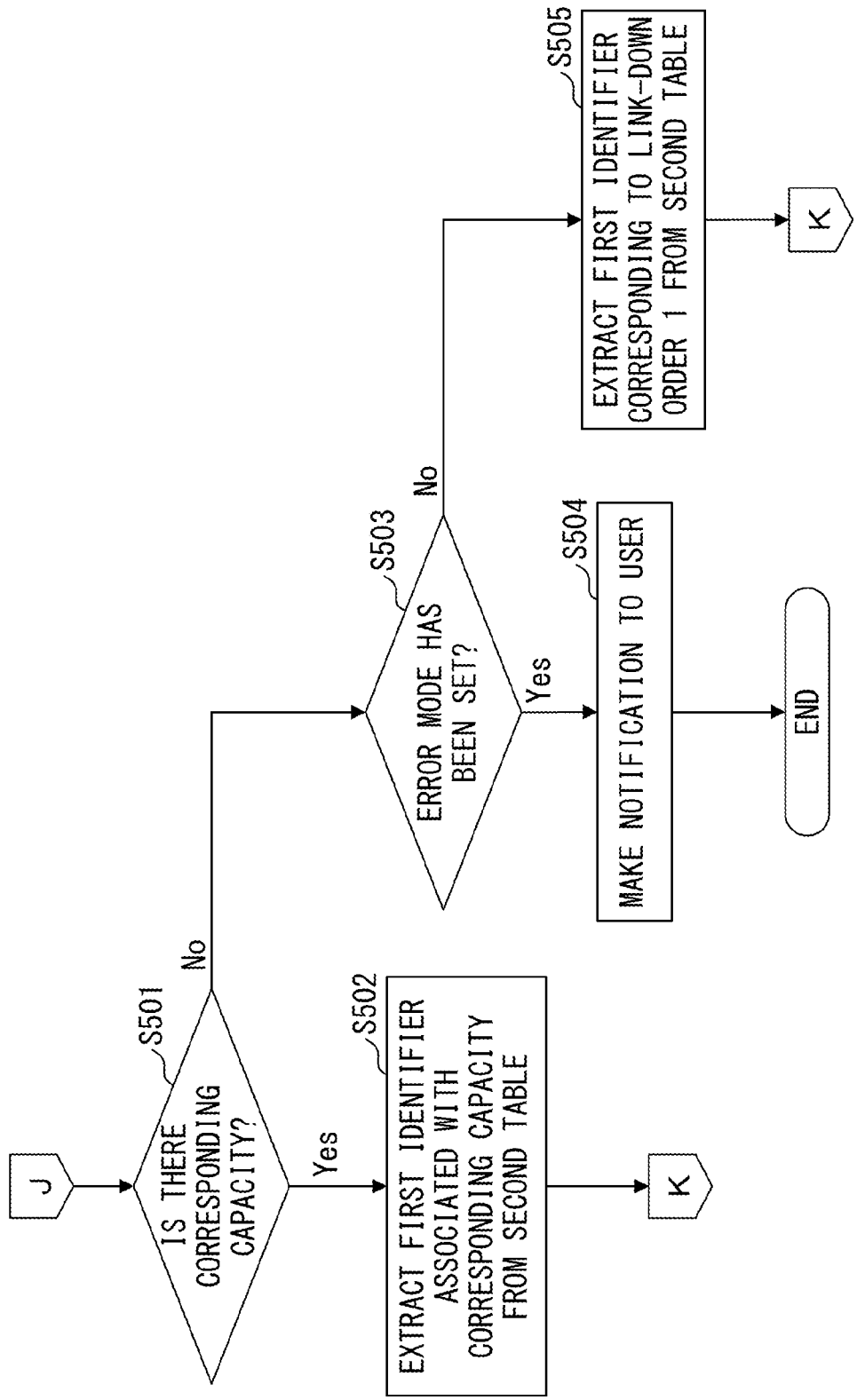
FIG. 43 is a flowchart illustrating processes performed by of a relaying apparatus (5)

An explanation is given with reference to FIG. 43.

Then, when the capacity that corresponds to the capacity of the storage device 4 to which the link-up has occurred exists in the second table (S501, Yes), the relaying apparatus 2 extracts the first identifier associated with the corresponding capacity from the second table 31 (S502). Then, the relaying apparatus 2 executes the process in S304.

When the capacity that corresponds to the capacity of the storage device 4 to which the link-up has occurred does not exist in the second table (S501, No), the relaying apparatus 2 judges whether or not an error mode has been set (S503). Meanwhile, the error mode is a mode in which, when information that corresponds to the address or the feature information of the storage device 4 to which a link-up has occurred does not exist in the second table 31, a notification is made to the user, for example, and whether or not to apply this mode is set by the user appropriately.

When the error mode has been set (S503, Yes), the relaying apparatus 2 makes a notification to the user (S504). Then, the relaying apparatus 2 terminates the relaying process.

Meanwhile, when the error mode has not been set (S503, No), the relaying apparatus 2 extracts the first identifier that corresponds to the link-down order 1 from the second table 31 (S505). Then, the relaying apparatus 2 executes the process in S304.

Figure 44:
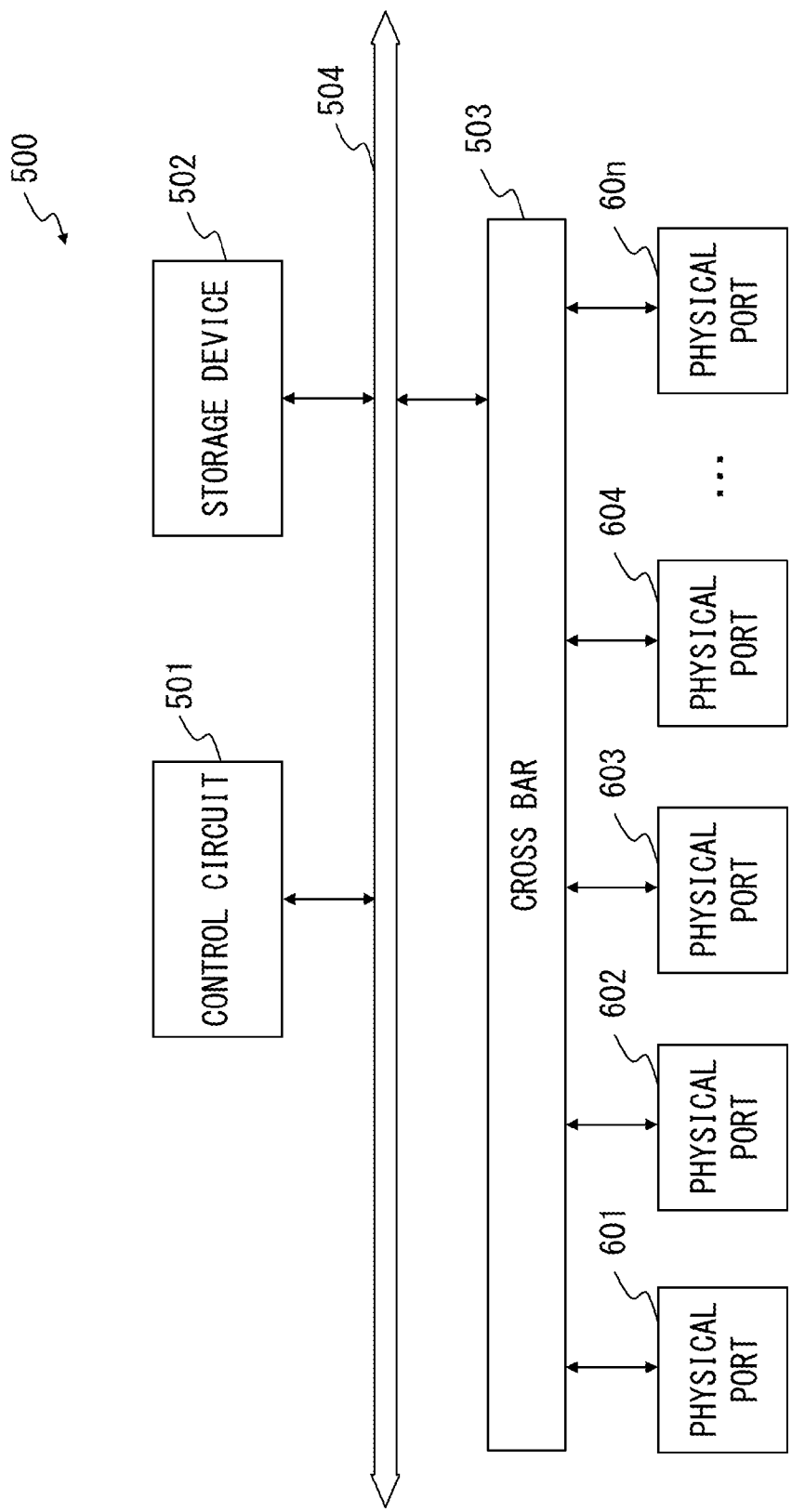
FIG. 44 is a block diagram illustrating an example of an expander.

FIG. 44 is a block diagram illustrating an example of the expander.

An expander 500 is equipped with a control circuit 501, a storage device 502, a crossbar 503, and physical ports 601 through 60n. Then, the control circuit 501, the storage device 502, and the crossbar 503 are connected via a bus 504.

The control circuit 501 is a computer (processor) that controls the entirety of the expander 500. The control circuit 501 is a CPU, a multicore CPU, an FPGA, and a PLD, or the like, for example. The control circuit 501 functions as the control unit 10 in FIG. 2, for example. Meanwhile, the first table 21 stored in the first storage unit 20 and the second table 31 stored in the second storage unit 30 may be stored in a cache of the CPU, the FPGA, and the PLD, for example.

The storage device 502 stores various data. The storage device 502 is constituted by a semiconductor memory such as a ROM and a RAM. The storage device 502 functions as the first storage unit 20 or the second storage unit 30 in FIG. 2, for example. Then, the storage device 502 may store the first table 21 and the second table 31 illustrated in FIG. 2, for example.

Meanwhile, the ROM stores various data and a program such as a boot program, an OS, an application program, firmware. The RAM is used as the work area of the control circuit 501.

The storage device 502 stores a relay program that makes the control circuit 501 function as the control unit 10, for example. In addition, the storage device 502 may be a storage medium that is connected to a read/write apparatus that is connected to the control circuit 501 via a bus and that is not illustrated in the drawing, and data read/write may be performed by controlling the read/write apparatus by the control circuit 501. Meanwhile, the recording medium is a non-transitory computer-readable recording medium such as an FD (Floppy Disk), a CD (Compact Disk), a DVD (Digital Versatile Disk), a BD (Blue-ray Disk: registered trademark), and a flash memory, or the like, for example.

When executing a relaying process, the relaying apparatus 2 reads the relay program stored in the storage device 502 onto the RAM, for example. Then, by executing the relay program read onto the RAM by control circuit 501, the relaying apparatus 2 executes the relaying process.

The crossbar 503 is controlled by the control circuit 501, and the crossbar 503 switches the physical port 601 through 60n used for forwarding data.

The physical port 601 through 60n functions as the transmitting/receiving unit 40 in FIG. 2.

As described above, when a link-down of the first connection unit 4m is detected, the relaying apparatus 2 according to the embodiment judges whether or not the address of the storage device 4 to which the link-down has occurred matches the address of the storage device 4 connected to the second connection unit 5m at the time when a link-up occurs to the second connection unit 5m. Then, when the two addresses for which the matching judgment has been made match, and when an access request is given from the control apparatus 310 with the first identifier that identifies the first connection unit 4m attached to the access request, the relaying apparatus 2 forwards data via the second connection unit 5m. Therefore, the higher-order apparatuses are able to access the storage device to which the link-down has occurred in the same manner as before the link-down.

The relaying apparatus 2 according to the embodiment associates the first identifier that identifies the first connection unit 4m to which a link-up has occurred with the address of the storage device 4 to which a link-down has occurred, and the relaying apparatus 2 writes them into the second table 31. Then, the relaying apparatus 2 associates the first identifier in the second table 31 associated with the storage device 4 to which a link-up has occurred and the address of the storage device 4 to which the link-up has occurred, and the relaying apparatus 2 writes them into the first table 21. Accordingly, the same first identifier as the one before the link-down is associated with and stored with the same storage device 4 in the first table 21. Therefore, the higher-order apparatuses are able to access the storage device to which the link-down has occurred in the same manner as before the link-down.

The relaying apparatus 2 according to the embodiment associates the first identifier associated with the order specified by the link-down order with the address of the storage device 4 to which a link-up has occurred, and the relaying apparatus 2 writes them into the first table 21. Accordingly, when the user connects another storage device 4 that has features that are equivalent to those of the failed storage device 4 to the second connection unit 5m according to the link-down order, the first identifier of the failed storage device 4 is associated with the connected other storage device 4. Therefore, the higher-order apparatuses may operate the storage apparatus 200 in the same manner as before the link-down.

The relaying apparatus 2 according to the embodiment rewrites the second identifier that is stored in the first table 21 and that is associated with the address of the storage device 4 to which the link-up has occurred into the first identifier associated with the feature information of the storage device 4 to which the link-up has occurred. Accordingly, when the user connects another storage device 4 that has features that are equivalent to those of the failed storage device 4 to the second connection unit 5m, the first identifier of the failed storage device 4 is associated with the connected other storage device 4. Therefore, the higher-order apparatuses may operate the storage apparatus 200 in the same manner as before the link-down.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A relaying apparatus placed between a control apparatus and a storage device in a storage apparatus, the relaying apparatus comprising:
   a first connection unit which is connected to a storage device;
   a second connection unit;
   a first storage unit which stores information in which a first identifier that identifies the first connection unit and an address of the storage device are associated;
   a second storage unit; and
   a processer which executes a process including:
      detecting a link-down of the first connection unit;
      when an address of a storage device that was connected to the first connection unit at a time when the link-down of the first connection unit was detected in the detecting process matches an address of a storage device connected to the second connection unit at a time when the storage device is connected to the second connection unit and a link-up occurs to the second connection unit, and when an access request with an attached first identifier that identifies the first connection unit is given from the control apparatus, forwarding data, which is a response to the access request, via the second connection unit, the second connection unit being used as a substitute for the first connection unit although the attached first identifier of the access request identifies the first connection unit;

writing information in which the first identifier that identifies the first connection unit to which the link-down has occurred is associated with an address of a storage device connected to the first connection unit to which the link-down has occurred, into the second storage unit;

writing information in which the first identifier associated with an address of a storage device connected to the second connection unit to which a link-up has occurred is associated with the address of the storage device connected to the second connection unit to which the link-up has occurred, into the first storage unit when a link-up occurs to the second connection unit and an address of a storage device connected to the second connection unit to which the link-up has occurred is stored in the second storage unit;

deleting, from the first storage unit, information in which the first identifier that identifies the first connection unit to which the link-down has occurred is associated with an address of the storage device connected to the first connection unit to which the link-down has occurred, when the information in which the first identifier that identifies the first connection unit to which the link-down has occurred is associated with the address of the storage device connected to the second connection unit to which the link-up has occurred is written into the first storage unit in the writing process; and referring to the first storage unit and forwarding data via a corresponding connection unit corresponding to the first identifier when an access request with an attached first identifier is given from the control apparatus.

2. The relaying apparatus according to claim 1, wherein the writing process executed by the processor further includes:

writing information in which the first identifier that identifies the first connection unit to which the link-down has occurred is associated with a link-down order that indicates an order of the link-down that has occurred to the first connection unit to which the link-down has occurred, into the second storage unit;

writing information in which the first identifier that is stored in the second storage unit and that is associated with the order specified by the link-down order is associated with the address of the storage device connected to the second connection unit to which the link-up has occurred, into the first storage unit and when the address of the storage device connected to the second connection unit to which the link-up has occurred is not stored in the second storage unit; and the deleting process executed by the processor further includes:

deleting, from the first storage unit, the information in which the first identifier to which the link-down has occurred is associated with the address of the storage device connected to the first connection unit to which the link-down has occurred, when writing the information in which the first identifier that is stored in the second storage unit and that is associated with the order specified by the link-down order is associated with the address of the storage device connected to the second connection unit to which the link-up has occurred, into the first storage unit.

3. The relaying apparatus according to claim 2, wherein the processes executed by the processor further includes:

outputting information in which the first identifier stored in the second storage unit that identifies the first connection unit to which the link-down has occurred is associated with a link-down order that indicates an order of the link-down that has occurred to the first connection to which the link-down has occurred.

4. The relaying apparatus according to claim 1, wherein the writing process executed by the processor further includes:

writing information in which the first identifier that identifies the first connection unit to which the link-down has occurred is associated with the address of the storage device connected to the first connection unit to which the link-down has occurred, into the second storage unit;

writing information in which the second identifier that identifies the second connection unit to which the link-up has occurred is associated with the address of the storage device connected to the second connection unit to which the link-up has occurred, into the first storage unit when a link-up occurs to the second connection unit; and rewriting the second identifier that is stored in the first storage unit and that is associated with the address of the storage device connected to the second connection unit to which the link-up has occurred into the first identifier that is stored in the second storage unit and that is associated with the address of the storage device connected to the second connection unit to which the link-up has occurred when the address of the storage device connected to the second connection unit to which the link-up has occurred is stored in the second storage unit.

5. The relaying apparatus according to claim 4, wherein the writing process executed by the processor further includes:

writing information in which the first identifier that identifies the first connection unit to which the link-down has occurred is associated with a link-down order that indicates an order of the link-down that has occurred to the first connection unit to which the link-down has occurred, into the second storage unit; and rewriting the second identifier that is stored in the first storage unit and that is associated with the address of the storage device connected to the second connection unit to which the link-up has occurred into the first identifier associated with the order specified by the link-down order stored in the second storage unit when a link-up occurs to the second connection unit and the address of the storage device connected to the second connection unit to which the link-up has occurred is not stored in the second storage unit.

6. The relaying apparatus according to claim 5, wherein the writing process executed by the processor further includes:

rewriting the second identifier that is stored in the first storage unit and that is associated with the address of the storage device connected to the second connection unit to which the link-up has occurred into the first identifier associated with an order that indicates a last link-down in the link-down order stored in the second storage unit when a link-up occurs to the second connection unit and the address of the storage device connected to the second connection unit is not stored in the second storage unit.

7. The relaying apparatus according to claim 5, wherein the writing process executed by the processor further includes:
rewriting the second identifier that is stored in the first storage unit and that is associated with the address of the storage device connected to the second connection unit to which the link-up has occurred into the first identifier associated with an order that indicates a first link-down in the link-down order stored in the second storage unit when a link-up occurs to the second connection unit and the address of the storage device connected to the second connection unit is not stored in the second storage unit.

8. The relaying apparatus according to claim 4, wherein the writing process executed by the processor further includes:
writing information in which the first identifier that identifies the first connection unit to which the link-down has occurred is associated with feature information that indicates a feature of the storage device connected to the first connection unit to which the link-down has occurred, into the second storage unit;
extracting feature information that at least partly corresponds to feature information of the storage device connected to the second connection unit among the feature information stored in the second storage unit when a link-up occurs to the second connection unit and the address of the storage device connected to the second connection unit to which the link-up has occurred is not stored in the second storage unit; and
rewriting the second identifier that is stored in the first storage unit and that is associated with the address of the storage device connected to the second connection unit to which the link-up has occurred into the first identifier associated with the extracted feature information.

9. The relaying apparatus according to claim 8, wherein the feature information includes:
a plurality of features that a storage device possesses, and
the writing process executed by the processor further includes:
searching, from the feature information stored in the second storage unit, for a feature that corresponds to a feature that the storage device connected to the second connection unit possesses, from among the plurality of features that the storage device possesses, in order from a feature of a type that has a larger influence on an operation of the storage apparatus, and when there is one corresponding feature for one feature type; and
rewriting the second identifier that is stored in the first storage unit and that is associated with the address of the storage device connected to the second connection unit to which the link-up has occurred into the first identifier associated with the corresponding feature.

10. A storage apparatus comprising:
a board on which a storage device is placed, the board including a plurality of slots in which a first connector to which a first port provided in the relaying apparatus is connected and a second connector, the first connector and the second connector being point-symmetrically positioned;
a relaying apparatus placed between a control apparatus and the board, the relaying apparatus including:
a first port which is connected to the first connector;
a second port; and
a processor which excuses processes including:
detecting a link-down of the first port connected to the first connector; and
when the address of a storage device that was connected to the first port to which the link-down occurred at a time when the link-down of the first port was detected in the detecting process matches an address of a storage device connected to the second port at a time when the storage device is connected to the second connector and the storage device is connected to the second port, and a link-up occurs to the second port, and an access request is given from the control apparatus with an attached first identifier that identifies the first port, forwarding data, which is a response to the access request, via the second port, the second port being used as a substitute for the first port although the attached first identifier of the access request identifies the first port; and
a dongle connected between the storage device and the board, wherein
the board further includes
a third port which is connected to the second port,
the dongle includes:
a third connector which is connected the storage device;
a fourth connector which is connected to the first connector and the second connector of the board; and
a fourth port which is connected to the third port, and
when a link-up occurs, the storage device is connected to the second connector provided in the board via the third connector and the fourth connector provided in the dongle, and the storage device is also connected to the second port provided in the relaying apparatus via the third port provided in the board and the fourth port provided in the dongle.

11. A non-transitory computer-readable recording medium having stored therein a program for causing a processor to execute a relaying process to control a relaying apparatus placed between a control apparatus and a storage device in a storage apparatus, the process comprising:
detecting a link-down of a first connection unit connected to the storage device provided in the relaying apparatus;
writing information in which a first identifier that identifies the first connection unit to which the link-down has occurred is associated with an address of a storage device connected to the first connection unit to which the link-down has occurred, into a second storage unit;
writing information in which the first identifier associated with the address of a storage device connected to a second connection unit to which a link-up has occurred is associated with the address of the storage device connected to the second connection unit to which the link-up has occurred, into a first storage unit when a link-up occurs to the second connection unit and an address of a storage device connected to the second connection unit to which the link-up has occurred is stored in the second storage unit, the first storage unit storing information the first identifier and the address of the storage device are associated;

deleting, from the first storage unit, information in which the first identifier that identifies the first connection unit to which the link-down has occurred is associated with an address of the storage device connected to the first connection unit to which the link-down has occurred, when the information in which the first identifier that identifies the first connection unit to which the link-down has occurred is associated with the address of the storage device connected to the second connection unit to which the link-up has occurred is written into the first storage unit in the writing process; and referring to the first storage unit and forwarding data via a corresponding connection unit corresponding to the first identifier when an access request with an attached first identifier is given from the control apparatus.

12. A relaying apparatus placed between a control apparatus and a storage device in a storage apparatus, the relaying apparatus comprising:

a first connection unit which is connected to a storage device;

a second connection unit; and a processer which executes a process including:

detecting a link-down of the first connection unit;

when an address of a storage device that was connected to the first connection unit at a time when the link-down of the first connection unit was detected in the detecting process matches an address of a storage device connected to the second connection unit at a time when the storage device is connected to the second connection unit and a link-up occurs to the second connection unit, and when an access request with an attached first identifier that identifies the first connection unit is given from the control apparatus, forwarding data, which is a response to the access request, via the second connection unit, the second connection unit being used as a substitute for the first connection unit although the attached first identifier of the access request identifies the first connection unit; and when an address of a storage device that was connected to the first connection unit at a time when the link-down of the first connection unit was detected in the detecting process does not match an address of a storage device connected to the second connection unit at a time when the storage device is connected to the second connection unit and a link-up occurs to the second connection unit, and when at least a piece of feature information of the storage device that was connected to the first connection unit at a time when the link-down of the first connection unit was detected in the detecting process matches a piece of feature information of the storage device connected to the second connection unit at a time when the storage device is connected to the second connection unit and a link-up occurs to the second connection unit, treating the first identifier which identifies the first connection unit as a identifier which identifies the second connection unit.

13. The relaying apparatus according to claim 12, wherein the feature information of the storage device indicates at least one of a type, a capacity and a revolution speed of the storage device.

\* \* \* \* \*